US012625901B2

(12) United States Patent
Nainani et al.

(10) Patent No.: US 12,625,901 B2
(45) Date of Patent: May 12, 2026

(54) MACHINE LEARNING AND LANGUAGE MODEL-ASSISTED GEOSPATIAL DATA ANALYSIS AND VISUALIZATION

(71) Applicant: Palantir Technologies Inc., Denver, CO (US)

(72) Inventors: Nikhil Nainani, Pfäffikon (CH); Gabriel Seite, London (GB); Sameer Zaheer, Mississauga (CA); Elena Haddad, London (GB); Dudon Wai, Canmore (CA)

(73) Assignee: Palantir Technologies Inc., Aventura, FL (US)

( * ) Notice: Subject to any disclaimer, the term of this patent is extended or adjusted under 35 U.S.C. 154(b) by 0 days.

(21) Appl. No.: 18/666,231

(22) Filed: May 16, 2024

(65) Prior Publication Data

US 2024/0394296 A1      Nov. 28, 2024

Related U.S. Application Data

(60) Provisional application No. 63/503,827, filed on May 23, 2023, provisional application No. 63/532,259, filed on Aug. 11, 2023.

(51) Int. Cl.
| | |
|---|---|
| *G06F 16/387* | (2019.01) |
| *G06F 16/335* | (2019.01) |
| *G06F 16/383* | (2019.01) |

(52) U.S. Cl.
CPC .......... *G06F 16/387* (2019.01); *G06F 16/335* (2019.01); *G06F 16/383* (2019.01)

(58) Field of Classification Search
CPC ..... G06F 16/335; G06F 16/383; G06F 16/387

USPC .......................................................... 707/724
See application file for complete search history.

(56) References Cited

U.S. PATENT DOCUMENTS

| | | | | |
|---|---|---|---|---|
| 11,769,017 | B1 * | 9/2023 | Gray | G06F 16/3328 704/9 |
| 12,008,332 | B1 * | 6/2024 | Gardner | G06F 16/345 |
| 2005/0065959 | A1 * | 3/2005 | Smith | G06F 16/9537 707/769 |
| 2019/0220759 | A1 | 7/2019 | Tierney | |
| 2019/0294647 | A1 | 9/2019 | Brouwer, II et al. | |

(Continued)

OTHER PUBLICATIONS

National Renewable Energy Laboratory, "Solar Resource Maps and Data," https://www.nrel.gov/gis/solar-resource-maps.html, the version on May 7, 2023.

*Primary Examiner* — Shahid A Alam
(74) *Attorney, Agent, or Firm* — Faegre Drinker Biddle & Reath LLP

(57) ABSTRACT

Methods and systems for site prospecting includes the operations of: receiving a site request indicating a required use for a site; generating a plurality of capacity scores corresponding to a plurality of land parcels using a first machine learning model; filtering the plurality of land parcels into a subset of land parcels based on the plurality of capacity scores; and for at least one land parcel in the subset of land parcels: generating a parcel potential description using a first language model based at least in part on geographic information associated with the at least one land parcel; generating a parcel potential score using a second machine learning model based at least in part on the parcel potential description; and presenting the parcel potential description and the parcel potential score.

20 Claims, 10 Drawing Sheets

(56)           References Cited

U.S. PATENT DOCUMENTS

| | | | |
|---|---|---|---|
| 2020/0258174 A1 | 8/2020 | Rodriguez | |
| 2021/0110343 A1* | 4/2021 | Lagneaux | G06F 16/2365 |
| 2022/0067856 A1* | 3/2022 | Jurick | G06F 16/29 |
| 2023/0274086 A1* | 8/2023 | Tunstall-Pedoe | G06F 16/3344 |
| | | | 704/9 |
| 2023/0350929 A1* | 11/2023 | Hasan | G06F 16/3329 |
| 2024/0202225 A1* | 6/2024 | Siebel | G06F 16/3347 |

\* cited by examiner

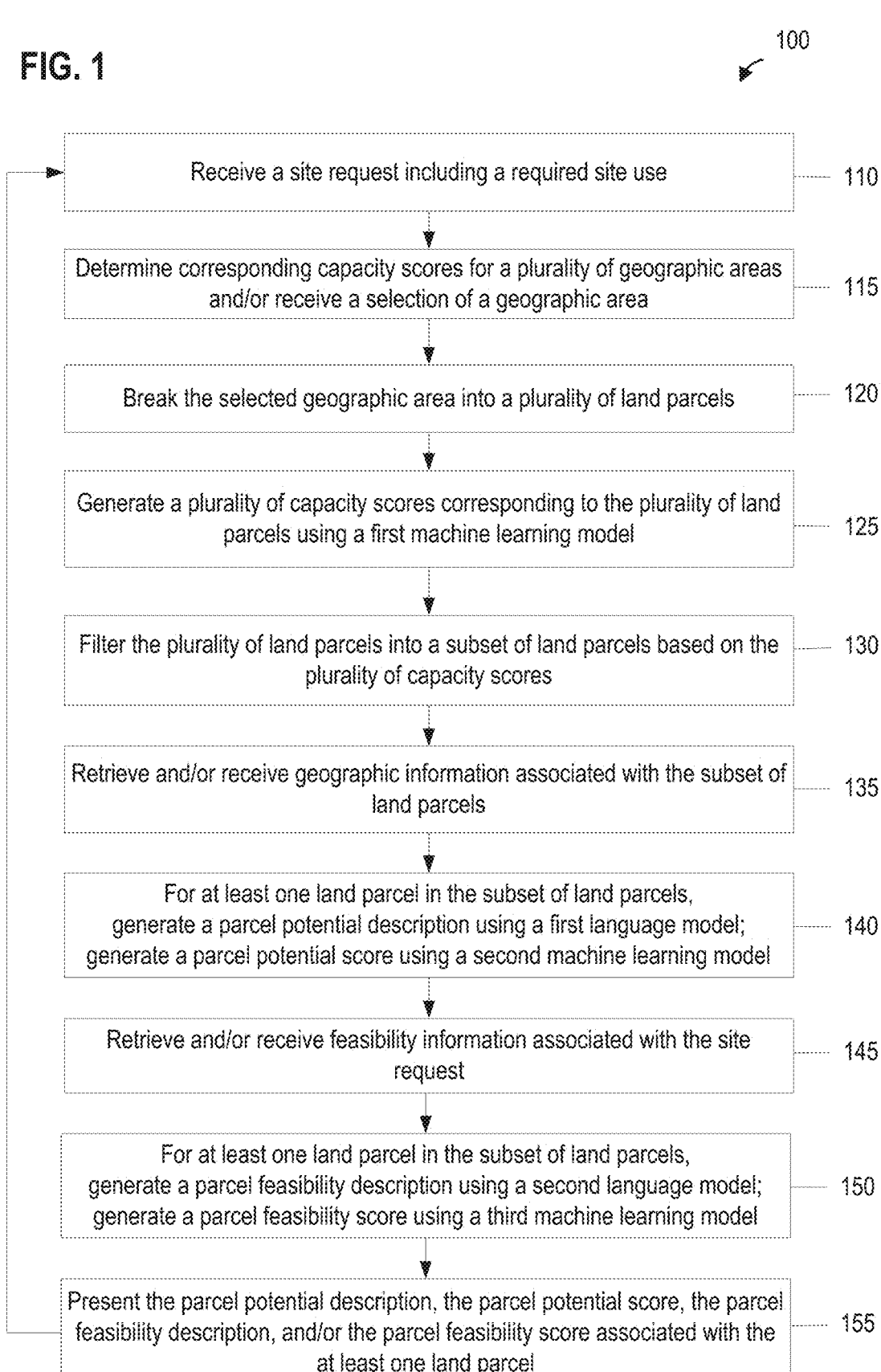

Receive a site request including a required site use —— 110

Determine corresponding capacity scores for a plurality of geographic areas and/or receive a selection of a geographic area —— 115

Break the selected geographic area into a plurality of land parcels —— 120

Generate a plurality of capacity scores corresponding to the plurality of land parcels using a first machine learning model —— 125

Filter the plurality of land parcels into a subset of land parcels based on the plurality of capacity scores —— 130

Retrieve and/or receive geographic information associated with the subset of land parcels —— 135

For at least one land parcel in the subset of land parcels, generate a parcel potential description using a first language model; generate a parcel potential score using a second machine learning model —— 140

Retrieve and/or receive feasibility information associated with the site request —— 145

For at least one land parcel in the subset of land parcels, generate a parcel feasibility description using a second language model; generate a parcel feasibility score using a third machine learning model —— 150

Present the parcel potential description, the parcel potential score, the parcel feasibility description, and/or the parcel feasibility score associated with the at least one land parcel —— 155

MACHINE LEARNING AND LANGUAGE MODEL-ASSISTED GEOSPATIAL DATA ANALYSIS AND VISUALIZATION

CROSS REFERENCE TO RELATED APPLICATIONS

This application claims the benefit of U.S. Provisional Application No. 63/503,827, filed May 23, 2023, and U.S. Provisional Application No. 63/532,259, filed Aug. 11, 2023, the disclosures of which are incorporated by reference herein in their entireties for all purposes.

TECHNICAL FIELD

Certain embodiments of the present disclosure are directed to systems and methods for selecting sites. More particularly, some embodiments of the present disclosure provide systems and methods for selecting sites using machine learning models and/or language models based on data.

BACKGROUND

A site prospecting process usually begins with a very large geographical area, such as a state or a province, and involves a lot of manual analysis (e.g., of geospatial data) and rule-based workflows to manually narrow down the large geographical area to a handful of sites for prospective development. Such manual processing can be very time-consuming (e.g., months or weeks) and expensive, typically requiring many site visits to select a site for the particular use, and can incur opportunity costs as well as fail to identify good sites due to pre-defined inflexible rules. Computerized systems may be used to record and visualize geospatial data, for example, including wind data such as wind speed, direction and sheer, solar data such as solar irradiance data.

Hence it is desirable to improve the techniques for geospatial data analysis and visualization.

SUMMARY

Certain embodiments of the present disclosure are directed to systems and methods for selecting sites. More particularly, some embodiments of the present disclosure provide systems and methods for selecting sites using machine learning models and/or language models based on data.

Disclosed are methods and systems for site prospecting. According to some embodiments, the method includes: receiving a site request indicating a required use for a site; generating a plurality of capacity scores corresponding to a plurality of land parcels using a first machine learning model; filtering the plurality of land parcels into a subset of land parcels based on the plurality of capacity scores; and for at least one land parcel in the subset of land parcels: generating a parcel potential description using a first language model based at least in part on geographic information associated with the at least one land parcel; generating a parcel potential score using a second machine learning model based at least in part on the parcel potential description; and presenting the parcel potential description and the parcel potential score. The method is performed using one or more processors.

According to some embodiments, the system includes one or more memories having instructions stored therein and one or more processors configured to execute the instructions and perform operations. The operations include: receiving a site request indicating a required use for a site; generating a plurality of capacity scores corresponding to a plurality of land parcels using a first machine learning model; filtering the plurality of land parcels into a subset of land parcels based on the plurality of capacity scores; and for at least one land parcel in the subset of land parcels: generating a parcel potential description using a first language model based at least in part on geographic information associated with the at least one land parcel; generating a parcel potential score using a second machine learning model based at least in part on the parcel potential description; and presenting the parcel potential description and the parcel potential score.

According to some embodiments, the method includes: receiving a site request indicating a required use for a site, and a plurality of geographic areas; generating a plurality of geographic area capacity scores corresponding to a plurality of geographic areas using a first machine learning model; selecting a geographic area from the plurality of geographic areas based on the plurality of geographic area capacity scores; breaking the selected geographic area into a plurality of land parcels; generating a plurality of land parcel capacity scores corresponding to the plurality of land parcels using a second machine learning model; filtering the plurality of land parcels into a subset of land parcels based on the plurality of land parcel capacity scores; for at least one land parcel in the subset of land parcels: generating a parcel potential description using a first language model based at least in part on geographic information associated with the at least one land parcel, generating a parcel potential score using a third machine learning model based at least in part on the parcel potential description; generating a parcel feasibility description using a second language model, and generating a parcel feasibility score using a fourth machine learning model; and presenting at least one selected from a group consisting of: the parcel potential description, the parcel potential score, the parcel feasibility description, and the parcel feasibility score. The method is performed using one or more processors.

Depending upon embodiment, one or more benefits may be achieved. These benefits and various additional objects, features and advantages of the present disclosure can be fully appreciated with reference to the detailed description and accompanying drawings that follow.

BRIEF DESCRIPTION OF THE DRAWINGS

The accompanying drawings are incorporated in and constitute a part of this specification and, together with the description, explain the features and principles of the disclosed embodiments. In the drawings, FIG. 1 is a simplified diagram showing a method for geospatial data analysis and visualization (e.g., site prospecting) according to certain embodiments of the present disclosure;

DETAILED DESCRIPTION

Figure 2:
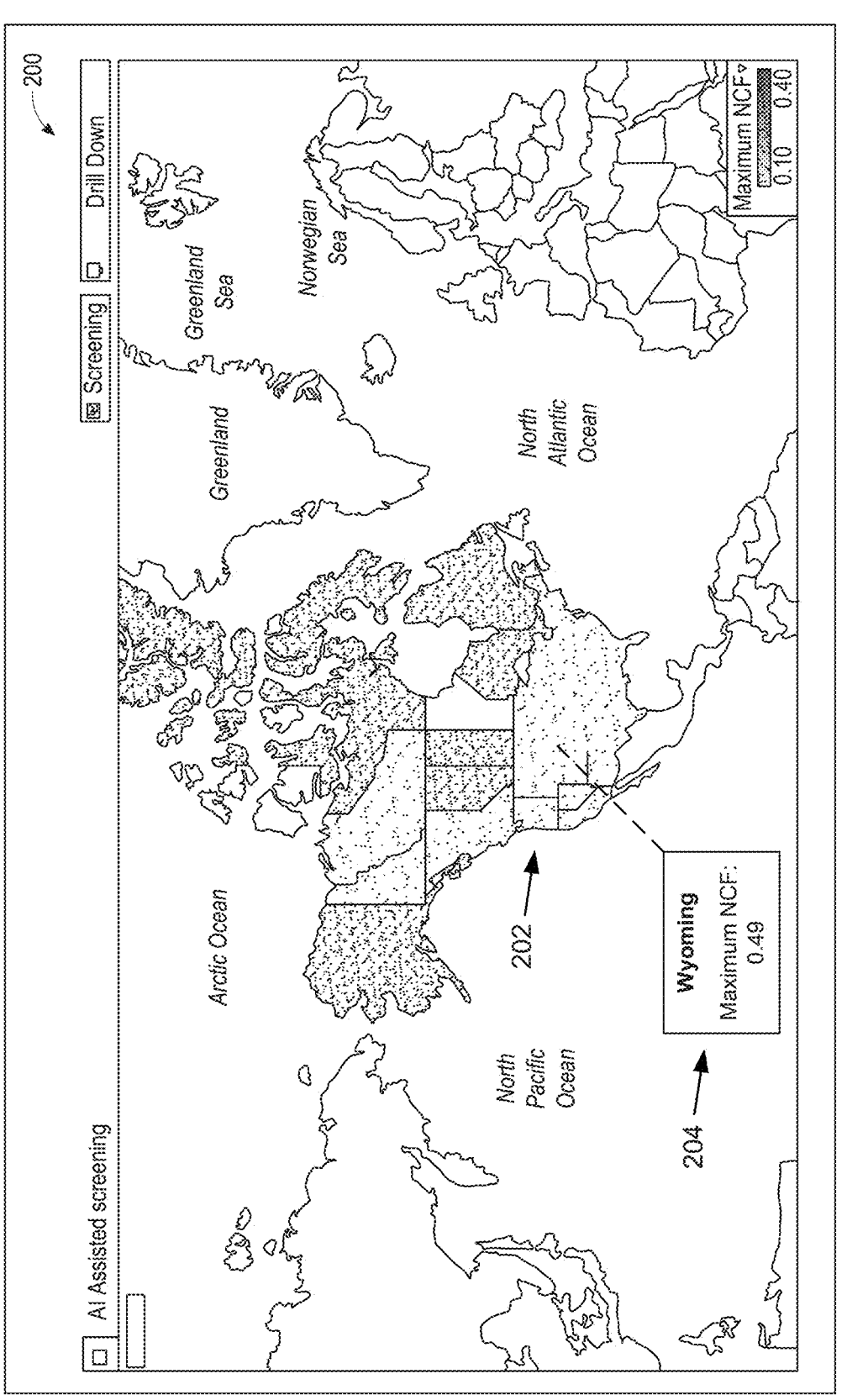
FIG. 2 is an illustration showing an example interactive graphical user interface ("GUI") of the system according to certain embodiments of the present disclosure.

Conventional systems and methods are unable to efficiently narrow down large geographic areas into fewer possible sites which can be manually analyzed for prospective development. For example, considering each geographic area individually and comparing one area with another to determine which area to suggest for prospective development is time-consuming due to the numerous requirements or prerequisites which must be overcome before any consideration may be placed.

Various embodiments of the present disclosure can achieve benefits and/or improvements by a computing system incorporating processes for site prospecting. In some embodiments, benefits include providing a faster and better process for site selection by leveraging machine learning models and simulations coupled with map-based visualizations. In certain embodiments, the benefits include allowing for the simultaneous or near-simultaneously simulations of geographic areas for multiple different configurations of renewable asset development, as well as for providing real-time or near-real-time visualization for user's review and analysis. In some embodiments, the benefits of such visualization include allowing for the geographic areas to be pre-filtered before being broken down into smaller sets of land parcels for further analysis and evaluation, thereby saving the processing time which would have otherwise been wasted on analyzing geographic areas which were not clearly viable for prospective development. In certain embodiments, summaries that are generated to include data such as text summaries, map-based visualizations, existing competitive assets, transmission infrastructure information, etc., can be used to generate an investment thesis and/or recommendation for the development of interest, thereby providing potential financial or business benefits for the users. In some embodiments, the benefits of the site election processes as disclosed herein also include reduction in the risk of potentially missing out on good or viable sites for prospective development due to pre-defined inflexible rules or limitations and thus resulting in financial losses caused by such oversight.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. As used herein, the term "receive" or "receiving" means obtaining from a data repository (e.g., database), from another system or service, from another software, or from another software component in a same software. In certain embodiments, the term "access" or "accessing" means retrieving data or information, and/or generating data or information.

Conventional systems and methods often take significant time (e.g., months, weeks) to find the appropriate site for a particular use (e.g., wind power plant, solar power plant, etc.). Conventional systems and methods typically require many site visits to select a site for the particular use.

Various embodiments of the present disclosure can achieve benefits and/or improvements by a computing system, for example, using machine learning models and/or language models to improve a site selection and site information visualization process. In some embodiments, benefits include significant improvements, including, for example, site selections and site information with quantitative and qualitative information. In certain embodiments, other benefits include comprehensive analyses of site related information (e.g., geospatial data, weather data, regulation data, etc.). In some embodiments, benefits further include the capability of generating text descriptions for sites using machine learning models and/or generative AI (artificial intelligence) models applied to geospatial data and text data. In certain embodiments, systems and methods are configured to gather geospatial data and text data to generate scores associated with sites and quality descriptions of the sites.

According to certain embodiments, systems and methods are directed to site prospecting including prescreening and selection of geographical sites with certain site requirements (e.g., location, size, environmental, regulatory, etc.). In some embodiments, site requirements include, for example, geospatial requirements, environmental requirements, regulation requirements, and/or the like. In certain embodiments, site prospecting can be based on various types of geospatial data, including environmental data at a geographic location, meteorological data, wind speed data, solar irradiance data, and/or the like. In some embodiments, computerized systems may be used to record and visualize geospatial data, including wind data such as wind speed, direction, and sheer, as well as solar data such as solar irradiance data.

According to some embodiments, site prospecting can include prescreening and selection of geographical sites for greenfield (and/or brownfield) development of, for example, renewables assets (e.g., arrays of solar panels). In some embodiments, such prescreening and selection can be based on, for example, various types of geospatial data, including environmental data at a geographic location, meteorological data, wind speed data, solar irradiance data, and/or the like. In certain examples, solar irradiance data can include various types of measurements of solar irradiance including, for example, global horizontal, direct normal, and diffuse horizontal irradiance. In certain examples, solar irradiance data can further include, for example, various types of meteorological data. The National Renewable Energy Laboratory ("NERL"), a national laboratory of the U.S. Department of Energy, for example, maintains a National Solar Radiation Database ("NSRDB"). The NSRDB is a serially complete collection of hourly and half-hourly values of the three most common measurements of solar irradiance-global horizontal, direct normal, and diffuse horizontal irradiance—and meteorological data.

According to some embodiments, a site prospecting process usually begins with a very large geographical area, such as a state or a province, and involves a lot of manual analysis (e.g., of geospatial data) and rule-based workflows to narrow down to a handful of sites for prospective development. In certain examples, such manual processing can be very time-consuming (e.g., months, weeks) and expensive, and can incur opportunity costs as well as fail to identify good sites due to pre-defined inflexible rules.

According to certain embodiments, systems and methods can make the site prospecting process faster and better by leveraging machine learning models, simulations coupled with map-based visualizations, and/or leveraging language models (e.g., a large language model (LLM)) for analysis. In some embodiments, the site prospecting process implemented by the systems and/or methods is iterative and may use a user input, where the process facilitates receiving and using the user input.

According to some embodiments, systems and methods for site prospecting can start with a large geographical area and remove any infeasible areas based on a site request, such as airports, roads, and/or the like. In certain embodiments, systems and methods can break down the remaining areas (e.g., remaining areas removing the infeasible areas) into smaller land parcels (e.g., thousands of land parcels) for analysis. In some examples, the land parcels have a substantially similar size (e.g., equally sized, polygons illustrated in FIG. 4). In some embodiments, systems and methods can use machine learning models to predict an indicative score for each land parcel and/or visualize the same on a map. In certain embodiments, systems and methods can simulate the areas for multiple different configurations (e.g., renewable asset developments) and/or visualize them. In some embodiments, systems and methods can simulate the areas for multiple different configurations (e.g., renewable asset developments) simultaneously and/or visualize them. In certain embodiments, the visualizations and simulated scores can then be used to pre-filter the land parcels into a smaller set.

In certain examples, systems and methods of the present disclosure can help renewable energy companies identify areas that could be a good prospective site for doing renewable development (e.g., greenfield renewable development). In some examples, the system can start with a large area and then the system can identify pockets within that area that have a good potential and feasibility of building a wind power plant, a solar power plant or any other renewable plant. In certain examples, the system can help assess and/or access various factors of sites (e.g., land parcels, pockets), see how the factors all play in, configure certain parameters such as, for example, the type of the wind turbines, the type of solar cells, and/or the like, and pick the suitable sites (e.g., best sites) according to their configurations.

In some examples, the system can do analysis on whether a respective site is feasible to build a plant here and/or whether the respective site is feasible to develop. The conventional approach often includes a lot of manual analysis to figure out different things like the climate, the weather, the elevation, the wind speed and other factors, such as ESG (environment, social, and governance) factors, regulatory factors, etc., to even filter down from thousands to hundreds, which is likely a very slow manual process and sometimes leads to missing good prospects during the manual process. In certain examples, the systems and methods for site prospecting can use large language models to determine the potential of the site and the feasibility of development on a respective site, for example, in a shorter time (e.g., days) than the manual analysis.

According to certain embodiments, for a set of prefiltered land parcels, the system can apply a language model to data from a plurality of data sources (e.g., private data source(s), public data source(s), open-source data sources, etc.) to query and summarize the potential and feasibility of developing a site on a land-parcel. In some embodiments, the text summary can be used to predict an indicative score (e.g., a potential score, a feasibility score) and combine with map-based visualizations, for example, with existing competitive assets and transmission infrastructure to create a site selection thesis.

At least some embodiments of the present disclosure relate to systems and methods for machine learning and language model-assisted geospatial data analysis and visualization. Certain embodiments of the present disclosure further include various processes, functionality, and interactive graphical user interfaces related to the system. According to various implementations, the system (and related processes, functionality, and interactive graphical user interfaces) can advantageously overcome various technical challenges mentioned above, among other technical challenges. For example, various implementations of the system can advantageously employ one or more machine learning models and/or language models to automatically and/or iteratively analyze geospatial data (including, e.g., solar irradiance data) to generate map-based visualizations and provide analyses and/or recommendations for, e.g., greenfield (and/or brownfield) development of, for example, renewables assets (such as, for example, arrays of solar panels). The system can, for example, advantageously make the site prospecting process faster and better by leveraging machine learning models and simulations, coupled with map-based visualizations, and finally leveraging language models for further analysis. The processes of the system can be iterative and can involve workflows including user input at various steps to improve identified solutions, analyses, and/or recommendations. The system can be used, for example, in industries including renewables and energy, among others.

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

In some embodiments, the term "model," can include any computer-based models of any type and of any level of complexity, such as any type of sequential, functional, or concurrent model. Models can further include various types of computational models, such as, for example, artificial neural networks ("ANN"), language models (e.g., large language models), artificial intelligence ("AI") models, machine learning ("ML") models, generative AI models, deep learning ("DL") models, image processing models, algorithms, rules, other computing models, large language models ("LLM"), and/or a combination thereof. In certain embodiments, systems and methods of the present disclosure are directed to generating a text summary from one or more event logs containing unstructured and/or structured data using one or more LLMs.

According to certain embodiments, a language model ("LM") may include an algorithm, rule, model, and/or other programmatic instructions that can predict the probability of a sequence of words. In some embodiments, a language model may, given a starting text string (e.g., one or more words), predict the next word in the sequence. In certain embodiments, a language model may calculate the probability of different word combinations based on the patterns learned during training (based on a set of text data from books, articles, websites, audio files, etc.). In some embodiments, a language model may generate many combinations of one or more next words (and/or sentences) that are coherent and contextually relevant. In certain embodiments, a language model can be an advanced artificial intelligence algorithm that has been trained to understand, generate, and manipulate language. In some embodiments, a language model can be useful for natural language processing, including receiving natural language prompts and providing natural language responses based on the text on which the model is trained. A language model may include an n-gram, exponential, positional, neural network, and/or other type of model.

According to some embodiments, a large language model ("LLM") includes any type of language model that has been trained on a larger data set and has a larger number of training parameters (e.g., billions of parameters) compared to a regular language model. In certain embodiments, an LLM can understand more intricate patterns and generate text that is more coherent and contextually relevant due to its extensive training. In some embodiments, an LLM may perform well on a wide range of topics and tasks. In certain embodiments, an LLM may comprise an artificial neural network trained using self-supervised learning. In some examples, an LLM may include a question-answer ("QA") LLM that may be optimized for generating answers from a context. In certain embodiments, an LLM can use a transformer architecture that is a deep learning architecture using an attention mechanism (e.g., which inputs deserve more attention than others in certain cases). In some embodiments, a language model includes an autoregressive language model, such as a Generative Pre-trained Transformer 3 (GPT-3) model, a GPT 3.5-turbo model, a Claude model, a command-xlang model, a bidirectional encoder representations from transformers (BERT) model, a pathways language model (PaLM) 2, and/or the like.

While certain aspects and implementations are discussed herein with reference to use of a language model, LLM, and/or AI, those aspects and implementations may be performed by any other language model, LLM, AI model, generative AI model, generative model, ML model, ANN, and/or other algorithmic processes. Similarly, while certain aspects and implementations are discussed herein with reference to use of a ML model, those aspects and implementations may be performed by any other AI model, generative AI model, generative model, ANN, and/or other algorithmic processes.

In various implementations, the LLMs and/or other models (including ML models) of the present disclosure may be locally hosted, cloud managed, accessed via one or more application programming interfaces ("APIs"), and/or any combination of the foregoing and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like.

FIG. 1 is a simplified diagram showing a method 100 for geospatial data analysis and visualization (e.g., site prospecting) according to certain embodiments of the present disclosure. This diagram is merely an example. One of ordinary skill in the art would recognize many variations, alternatives, and modifications. The method 100 for site prospecting includes processes 110, 115, 120, 125, 130, 135, 140, 145, 150, and 155. Although the above has been shown using a selected group of processes for the method 100 for site prospecting, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

In some embodiments, some or all processes (e.g., steps) of the method 100 are performed by a system (e.g., the computing system 1000). In certain examples, some or all processes (e.g., steps) of the method 100 are performed by a computer and/or a processor directed by a code. For example, a computer includes a server computer and/or a client computer (e.g., a personal computer). In some examples, some or all processes (e.g., steps) of the method 100 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, at process 110, the system receives a site request including a required site use. In certain embodiments, the site request is to select a site for the required site use, also referred to as a required use. In some embodiments, the site request is to select a site for a renewable energy plant. In some embodiments, the site request is to select a site with one or more geospatial requirements. In certain embodiments, the one or more geospatial requirements include one or more environmental requirements for the selected site. In some embodiments, at least one of the one or more geospatial requirements are associated with one or more environmental features. In certain embodiments, the required site use is associated with one or more environmental requirements. In some embodiments, the required site use is associated with one or more regulatory requirements and/or governance requirements.

According to certain embodiments, the site request includes one or more site parameters. In some embodiments, the site parameters include a location parameter such as, for example, a geographic area (e.g., a country, a region, a state, an area defined by longitude and/or latitude ranges, etc.). In certain embodiments, the site parameters include a size parameter such as, for example, a required size, a desired size, a size range, and/or the like. In some embodiments, the site parameters include an environment parameter such as, for example, an environment parameter over time, wind speed greater than a threshold for a time threshold (e.g., 100 days) over a time period (e.g., a year), sunlight greater than a threshold for a time threshold (e.g., 100 days) over a time period (e.g., a year). In certain embodiments, the site parameters include a use parameter such as, for example, for a wind power plant, for a solar power plant, and/or the like. In some embodiments, the site parameters include at least one selected from a group consisting of a size, a geographic parameter, a use parameter, a wind parameter, a solar parameter, and a site use.

According to some embodiments, at process 115, the system determines capacity scores for corresponding geographic areas, for example, using a capacity metric model and/or other ML models. In certain examples, the system presents the capacity scores 204 with the areas 202, as illustrated in FIG. 2. In some embodiments, the geographic area (e.g., North America) is determined based on the site request and/or a site parameter in the site request. In some embodiments, the system uses a regression model to determine net capacity factor ("NCF", for example, a ratio of total production divided by total capacity) scores for the areas. In certain embodiments, at process 115, the system selects and/or receives a selection of a geographic area, for example, based on one or more user inputs and/or the determined capacity scores. In some examples, the system can select a geographic area that has the highest capacity score.

Figure 3:
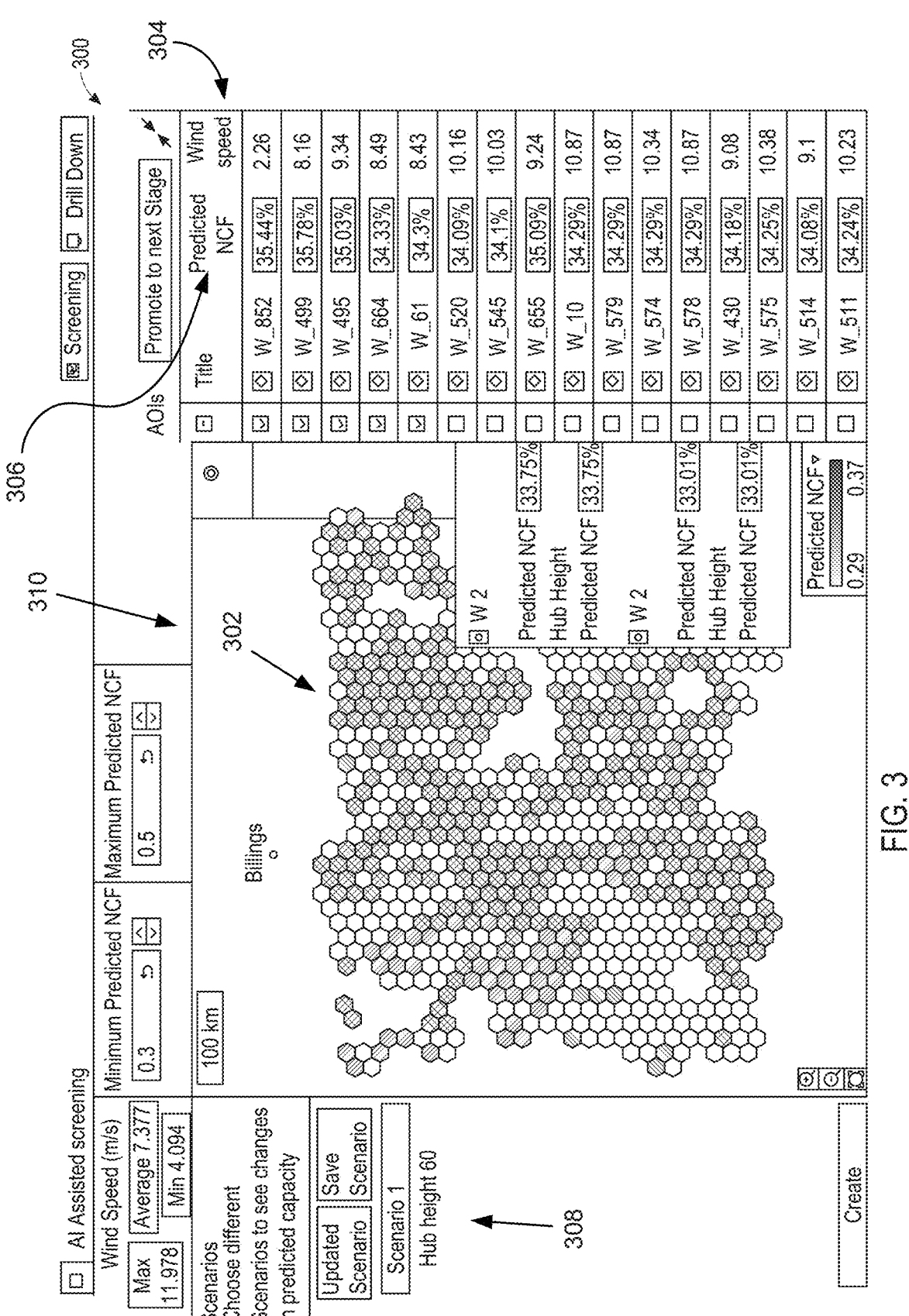
FIG. 3 is an illustration showing another example interactive GUI of the system according to certain embodiments of the present disclosure.

According to certain embodiments, at process 120, the system breaks the selected geographic area (e.g., a large geographic area, a country, a state, a region, a province, etc.) into a plurality of land parcels. FIG. 3 illustrates an example interactive user interface 300 showing a plurality of land parcels 302 (e.g., geospatial areas, small geospatial areas, etc.). In some embodiments, each of the plurality of land parcels has substantially the same size. In certain examples, a land parcel has a shape polygon (e.g., 5 kilometers per edge). In some examples, a size of a land parcel is determined based on the size request and/or a site parameter in the site request. In certain examples, at least two parcels have different sizes. In some embodiments, the visual indication of each land parcel is overlaid on a map 310 (e.g., a map-based illustration, a map-based visualization).

Figure 4:
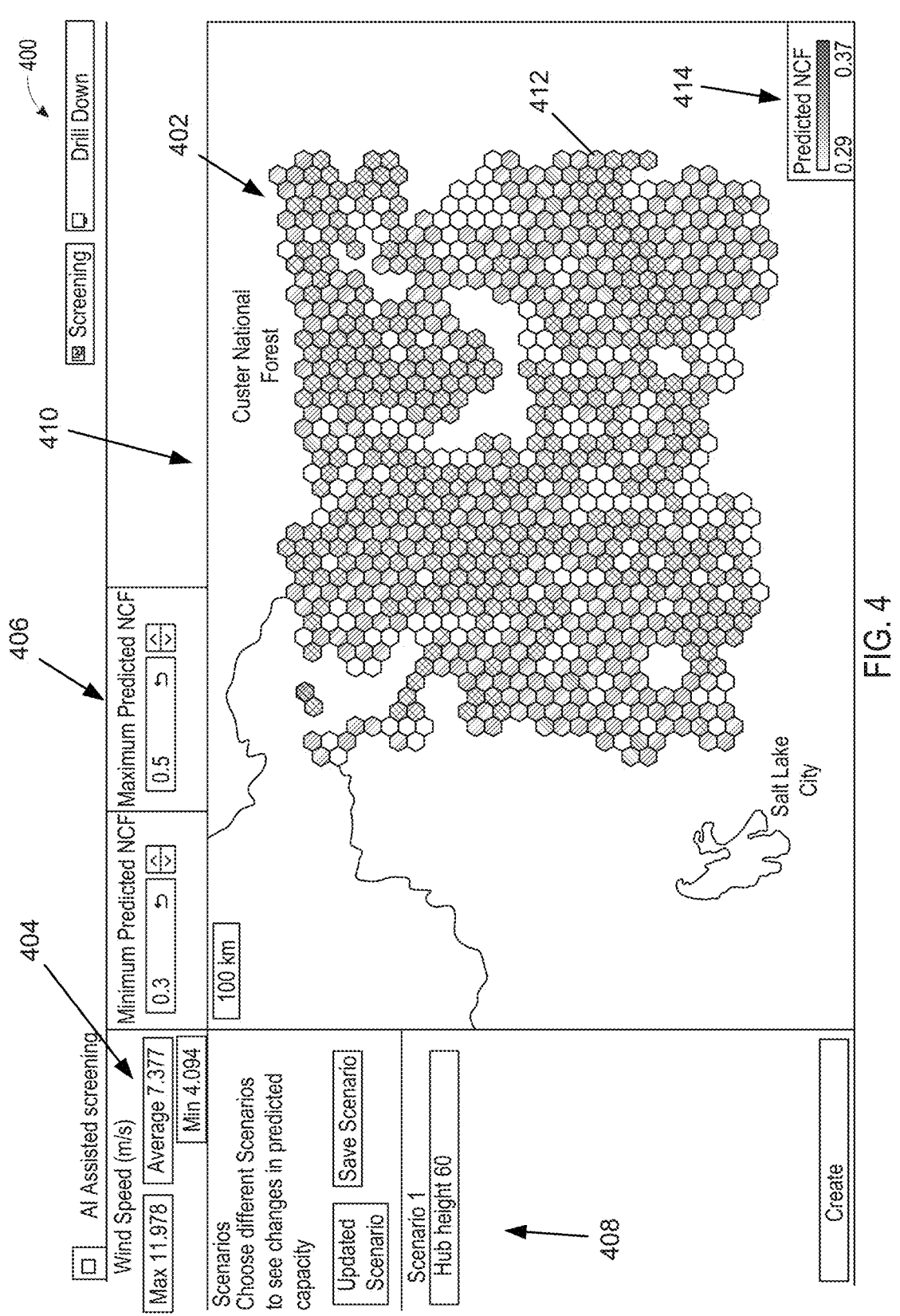
FIG. 4 is an illustration showing another example interactive GUI of the system according to certain embodiments of the present disclosure.

According to some embodiments, at process 125, the system generates a plurality of capacity scores corresponding to the plurality of land parcels using a first machine learning model. In certain embodiments, the first machine learning model includes a regression model. In some embodiments, the first machine learning model includes one or more quantitative ML models. In certain embodiments, the first machine learning model is configured to use one or more of weather data (e.g., wind speed, temperature, vapor pressure, wind direction etc.), geographical data (e.g., latitude, longitude, terrain complexity, elevation above sea level, etc.), electric data (e.g., number of wind turbines in the vicinity, number of substations in the vicinity, etc.), infrastructure data (e.g., electric grid data, etc.), and/or the like, collectively referred to as geospatial data or geographic data. In some embodiments, the first machine learning model is configured to apply to the weather data, the geographical data, and/or the electric data. In certain embodiments, the first machine learning model is configured to output a capacity score (e.g., net capacity factor score (NCF score), percentage of rated capacity produced in a year, etc.). In some embodiments, the system presents the land parcels with indicators (e.g., color, pattern, weight, etc.) of the capacity scores. FIG. 4 shows an illustrative example of a graphical user interface 400 showing land parcels 402 and corresponding capacity score indicators 412. In some embodiments, the visual indication of each land parcel is overlaid on a map 410 (e.g., map-based illustration, map-based display, map-based visualization). In certain embodiments, the visual indication of each land parcel includes a visual parameter 414 (e.g., color, filled pattern, line weights, etc.) indicating the corresponding capacity score, also referred to as capacity score indicator. In some examples, a lighter color or shading in the visual parameter 414 may represent a lower predicted NCF score than a darker color or shading.

In certain embodiments, the system can include a machine learning model to predict and/or determine power connectivity (e.g., transmission connectivity). In some embodiments, the machine learning model can be run in parallel or subsequent to the machine learning model to generate outputs to be used for filtering the plurality of land parcels.

Figure 5:
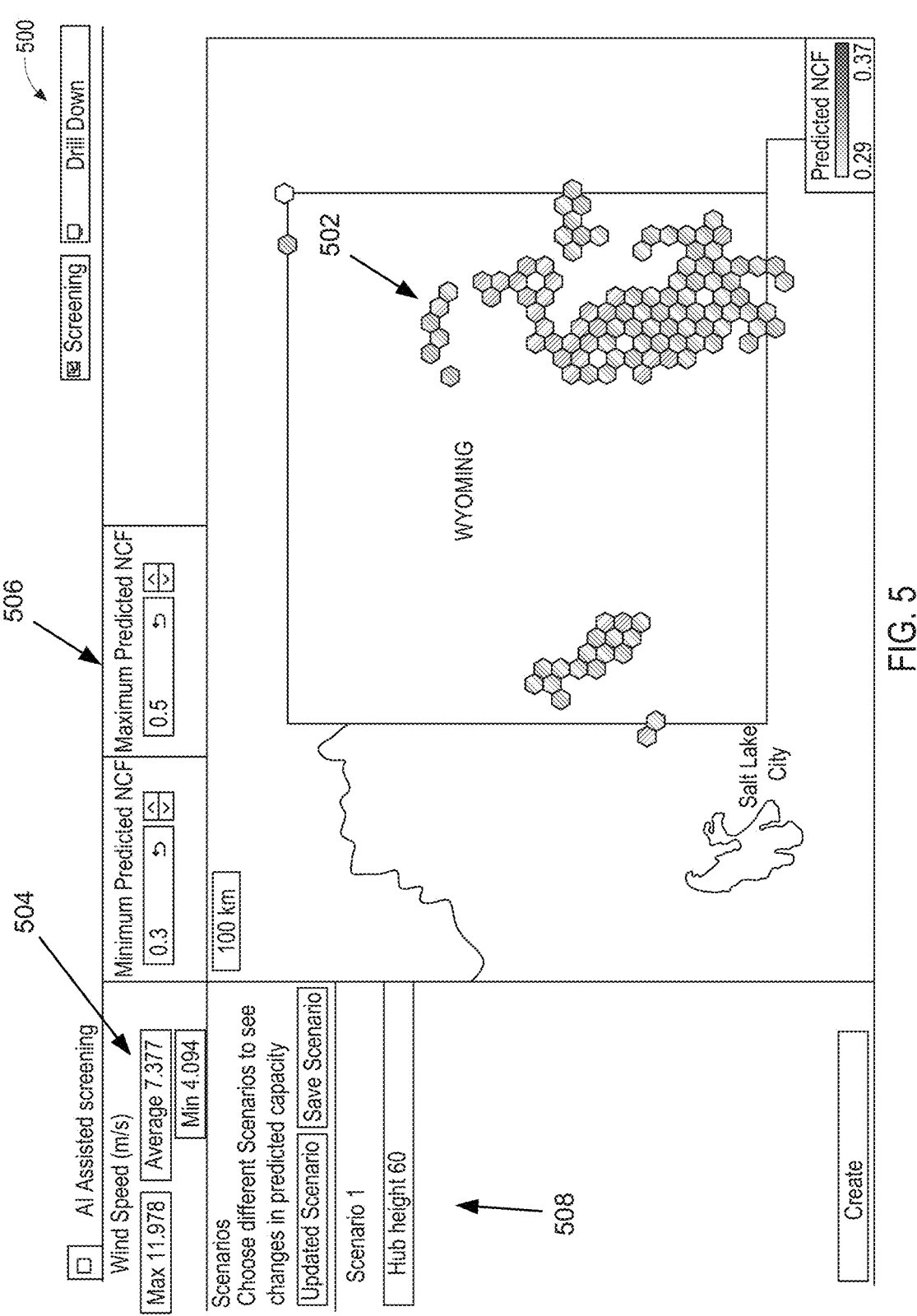
FIG. 5 is an illustration showing another example interactive GUI of the system according to certain embodiments of the present disclosure.

According to certain embodiments, at process 130, the system filters the plurality of land parcels into a subset of land parcels based on the plurality of capacity scores. In some embodiments, the system removes one or more infeasible land parcels in the geographic area and/or the plurality of land parcels to generate one or more feasible areas. In some embodiments, the system filters the plurality of land parcels using a filtering threshold and/or a filtering range. In certain embodiments, each land parcel in the subset of land parcels has a capacity score greater than the filtering threshold (e.g., 0.35). In some embodiments, each land parcel in the subset of land parcels has a capacity score within the filter range (e.g., 0.35-0.5). In certain embodiments, the system filters the plurality of land parcels into a subset of land parcels based on the plurality of capacity scores and user inputs. FIG. 5 is an example user interface 500 illustrating the filtering process.

Figure 6:
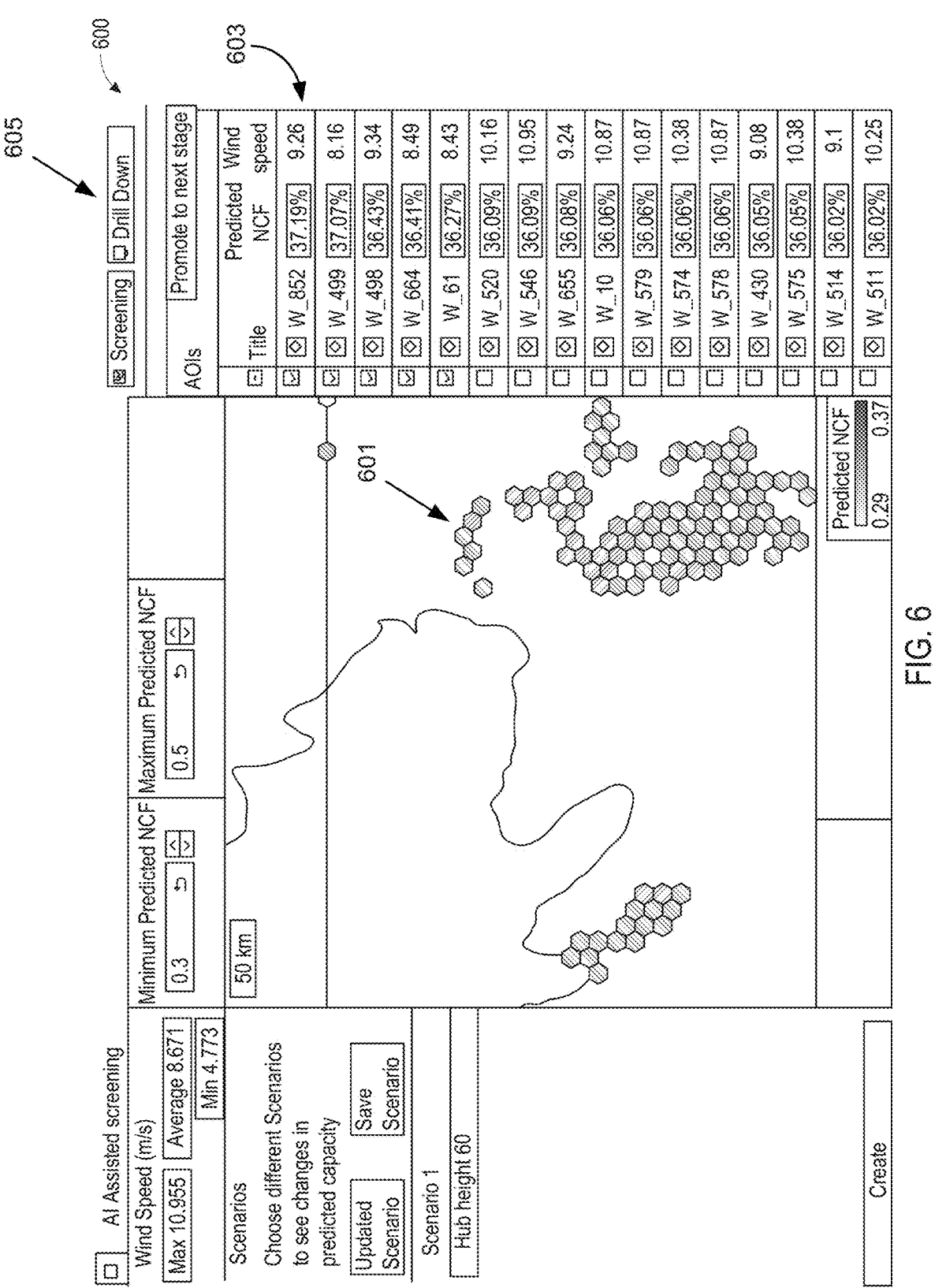
FIG. 6 is an illustration showing another example interactive GUI of the system according to certain embodiments of the present disclosure.

According to some embodiments, at process 135, the system collects, retrieves, and/or receives geographic information associated with the subset of land parcels. In certain embodiments, the system retrieves and/or receives geographic information associated with the subset of land parcels via a software plugin (e.g., an LLM plugin). In some embodiments, a software plugin refers to a software component that adds a specific feature, for example, retrieving data from a data source. In certain embodiments, an large language model (LLM) plugin refers to a software component interfacing with an LLM that adds a specific feature. In certain embodiments, the system receives one or more data sources (e.g., trusted data sources, links to data sources, indications of data sources, etc.) and retrieves geographic information from at least one of the one or more data sources. In some embodiments, by receiving the data sources, the system can generate land parcel descriptions more effectively. In some embodiments, by receiving the trusted data sources, the system can generate land parcel descriptions more accurately. In certain embodiments, the geographic information includes geographical data, weather data, and/or other data. In some embodiments, the geographic information includes unstructured text data (e.g., natural language text data). In certain embodiments, the geographic information includes unstructured text data (e.g., natural language text data) and/or structured text data. In certain embodiments, the geographic information includes unstructured text data associated with a location (e.g., a city, an area, etc.). In some embodiments, the system allows a selection from the subset of land parcels. FIG. 6 illustrates an interactive graphical user interface 600 for selecting land parcels 601.

According to certain embodiments, at process 140, for at least one land parcel in the subset of land parcels and/or for each land parcel in the subset of land parcels, the system generates a parcel potential description (e.g., parcel potential text, text output describing the potential for the land parcel) using a first language model, for example, based on the geographic information, the corresponding capacity score, and/or geographic data. In some embodiments, the first language model includes a large language model. In certain embodiments, the first language model takes the input data of one or more of a corresponding capacity score, geographic data (e.g., latitude, longitude, GPS data, altitude, etc.), unstructured text data (e.g., descriptions associated with the land parcel, weather data, etc.), and/or the like. In some embodiments, at least some of the input data from the first language model (e.g., a potential text model) is received via a software plugin (e.g., an LLM plugin, an OpenAI plugin, etc.). In certain embodiments, the first language model is configured to generate (e.g., output) a parcel potential description (e.g., parcel potential text, text output describing the potential for the land parcel).

Figure 7:
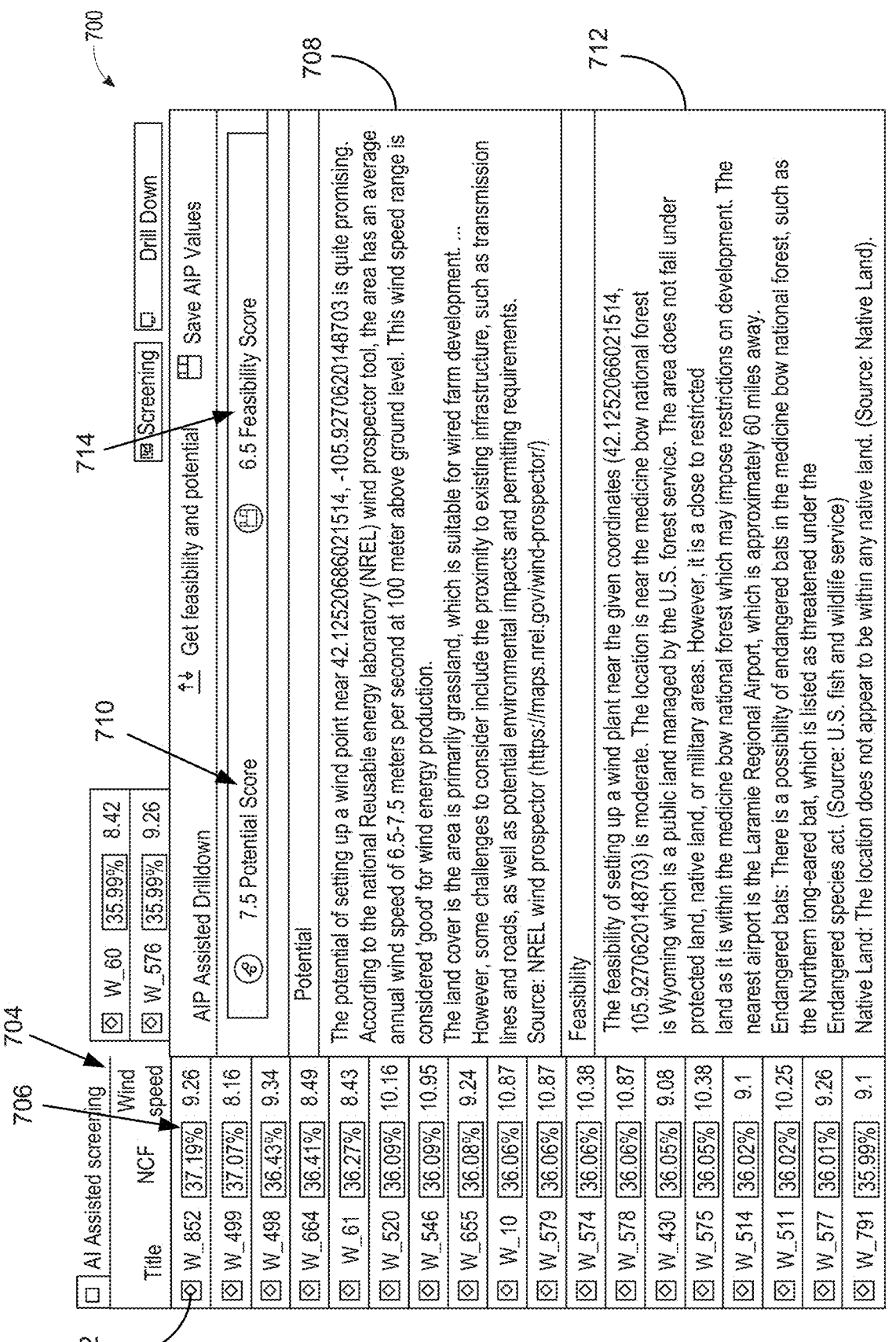
FIG. 7 is an illustration showing another example interactive GUI of the system according to certain embodiments of the present disclosure.

According to some embodiments, at process 140, for at least one land parcel in the subset of land parcels and/or for each land parcel in the subset of land parcels, the system generates a parcel potential score using a second machine learning model, for example, based on the parcel potential description. In certain embodiments, the second machine learning model includes a natural language processing model. In some embodiments, the second machine learning model (e.g., a potential score model) generates a potential score (e.g., a score of 1-10, etc.) based at least in part on the parcel potential description. In certain embodiments, the second machine learning model generates the potential score with a range (e.g., in the range of a minimum score and a maximum score). In some embodiments, the system is configured to present the parcel potential description and/or the parcel potential score. FIG. 7 shows an illustrative example of a graphical user interface 700 presenting the parcel potential description 708 and the parcel potential score 710. In certain embodiments, the first language model is coupled to the second machine learning model via a software interface (e.g., an interface between two or more software components). In some embodiments, a software interface includes an application programming interface (API), a web service interface, retrieving information from a file, retrieving information from a data repository, and/or the like.

According to certain embodiments, at process 145, the system collects, retrieves, and/or receives feasibility requirements and/or feasibility information associated with the subset of land parcels. In certain embodiments, the system retrieves and/or receives feasibility information (e.g., feasibility requirements, regulatory information, governance information, etc.) associated with the subset of land parcels via a software plugin. In some embodiments, the system receives one or more data sources (e.g., trusted data sources, links to data sources, indications of data sources, etc.) and retrieves feasibility information (e.g., feasibility requirements, regulatory information, governance information, ESG (environmental, social, governance) information, etc.) from at least one of the one or more data sources. In some embodiments, by receiving the data sources, the system can generate land parcel descriptions more effectively. In some embodiments, by receiving the trusted data sources, the system can generate land parcel descriptions more accurately. In certain embodiments, the feasibility information and/or requirements include ESG requirements, regulatory requirements, and/or other data. In some embodiments, the feasibility information includes unstructured text data (e.g., natural language text data, an endanger species, etc.). In certain embodiments, the feasibility information includes unstructured text data associated with a location (e.g., a city, an area, etc.). In some embodiments, the feasibility information includes unstructured text data and/or structured text data associated with a location (e.g., a city, an area, etc.).

According to certain embodiments, at process 150, for at least one land parcel in the subset of land parcels and/or for each land parcel in the subset of land parcels, the system generates a parcel feasibility description (e.g., parcel feasibility text, text output describing the feasibility for the land parcel) using a second language model, for example, based on the feasibility information and/or geographic data. In some embodiments, the second language model includes a large language model. In certain embodiments, the second language model takes the input data of unstructured text data (e.g., descriptions associated with the land parcel, ESG data, etc.), and/or the like. In some embodiments, at least some of the input data of the second language model (e.g., a feasibility text model) is received via a software plugin (e.g., an LLM plugin). In certain embodiments, the second language model is configured to generate (e.g., output) a parcel feasibility description (e.g., parcel feasibility text, text output describing the feasibility for the land parcel).

According to some embodiments, at process 150, for at least one land parcel in the subset of land parcels and/or for each land parcel in the subset of land parcels, the system generates a parcel feasibility score using a third machine learning model, for example, based on the parcel feasibility description. In certain embodiments, the third machine learning model includes a natural language processing model. In some embodiments, the third machine learning model (e.g., a feasibility score model) generates a feasibility score (e.g., a score of 1-10, etc.) based at least in part on the parcel feasibility description. In certain embodiments, the third machine learning model generates the feasibility score with a range (e.g., in the range of a minimum score and a maximum score). In some embodiments, the system is configured to present the parcel feasibility description and/or the parcel feasibility score.

According to certain embodiments, at process 155, the system presents the parcel potential description, the parcel potential score, the parcel feasibility description, and/or the parcel feasibility score associated with the at least one land parcel. FIG. 7 shows an illustrative example of a graphical user interface 700 presenting the parcel feasibility description 712 and the parcel feasibility score 714. In some embodiments, the processes and/or one or more processes illustrated in FIG. 1 are iterative. For example, the method 100 may go back to the process 110. As an example, the method 100 may go back to the process 135 or the process

140. In certain embodiments, the first machine learning model, the second machine learning model, and/or the third machine learning model include a regression model. In some embodiments, the first language model and/or the second language model are configured to receive data from a software plugin (e.g., an LLM plugin) of one or more data sources.

According to some embodiments, the system maintains a list of whitelisted software tools to interface with (e.g., via a plugin). In certain embodiments, the first machine learning model is trained and retrained using capacity scores and associated geospatial data. In some embodiments, the second machine learning model is trained and retrained using potential scores and/or associated geographic information. In certain embodiments, the third machine learning model is trained and retrained using feasibility scores and/or associated feasibility information. In some embodiments, the system can integrate with a contract system, for example, to retrieve feasibility information (e.g., leasing agreements). In certain embodiments, the system can retrieve information from news agencies to retrieve information in a timely manner. In some embodiments, the system can present the information and/or overlay information on a geographic map.

In certain embodiments, the system can provide initial consideration of a large geographical area, such as a state or a province. The system can then remove any areas that are not suitable or infeasible for the development of interest (e.g., a development type of interest), such as, for example, airports, roads, defense areas, and/or the like. The system can then break down the remaining areas into many (e.g., 1000s) of smaller equal (or similarly) sized land parcels (e.g., geospatial areas) for further analysis. The system can then use one or more ML models, and based on, for example, various geospatial data (e.g., solar irradiance and/or meteorological data) and/or other data to predict a score for each geospatial areas that is indicative of, for example, the suitability and/or desirability of the geospatial areas for the development of interest. The system can further provide a map-based visualization of such geospatial areas and associated scores. The system can allow for simulating and visualization of the geospatial areas for multiple different configurations (e.g., based on various user inputs) of developments of interest, e.g., various configurations of renewables asset development. The system can then use the visualizations and simulated scores, as well as various user inputs, to filter the geospatial areas into a smaller set.

For the smaller set of geospatial areas (e.g., the "screened sites"), the system can then use one or more LLMs to analyze and summarize the potential, feasibility, and/or desirability of the development(s) of interest in each of the geospatial areas of the smaller set of geospatial areas. The system can, for example, provide a query or prompt to an LLM including, for example, identification of the geospatial areas, geospatial data (e.g., internal, third-party, and/or geospatial data, such as solar irradiance data), context of the development of interest, additional prompt information and/or user input, and/or the like. The system can then receive an output from the LLM and parse the output to generate a report and/or summary of the potential, feasibility, and/or desirability of the development(s) of interest in each of the geospatial areas of the smaller set of geospatial areas. The system can use, e.g., text summaries received from the LLM, and/or prompt the LLM, to predict scores for each smaller set of geospatial areas that is indicative of, for example, the suitability and/or desirability of the geospatial areas for the development of interest. The system can further use, e.g., text summaries, map-based visualizations, existing competitive assets, transmission infrastructure information, and/or other information, to generate (e.g., via prompt to the LLM and/or otherwise) an investment thesis and/or recommendation for the development of interest.

FIG. 2 is an example interactive graphical user interface ("GUI") 200 of the system that includes a map-based display (e.g., a map-based visualization) of one or more large geographical areas 202 that are selectable by a user, and which can display geospatial information and/or analyses (e.g., scores 204) based on geospatial information (e.g., from one or more ML models), optionally aggregated, associated with the areas. In the example shown, the geographical areas 202 may include regions, counties, provinces, states, and/or countries, and the displayed score 204 may include the NCF score of the selected area, which in this example is the state of Wyoming. FIG. 2 is merely an example. One of ordinary skill in the art would recognize many variations, alternatives, and modifications.

FIG. 3 is an example interactive GUI 300 of the system that includes a map-based display of one or more smaller geospatial areas 302 (e.g., for a selected state, land parcels, etc.) that are selectable by a user on a map 310, and which can display geospatial information and/or analyses (e.g., scores 306) based on geospatial information 304 (e.g., from one or more ML models), optionally aggregated, associated with the areas, and based on a first (selectable or configurable) configuration of a development of interest (e.g., scenario 308). In the example shown, the smaller geospatial areas 302 are represented in hexagonal blocks, with each hexagonal block having a separate title such as "W_852", "W_499", etc., and the geospatial information 304 may include wind speeds measured in m/s, for example. As shown, different scenarios 308 may be selected or chosen to see how the predicted capacity, such as the predicted NCF scores 306, may change. FIG. 3 is merely an example. One of ordinary skill in the art would recognize many variations, alternatives, and modifications.

FIG. 4 is an example interactive GUI 400 of the system that includes a map-based display of one or more smaller geospatial areas 402 (e.g., for a selected state, land parcels, etc.) that are selectable by a user on a map 410, and which can display geospatial information and/or analyses (e.g., scores 406) based on geospatial information 404 (e.g., from one or more ML models), optionally aggregated, associated with the areas, and based on a second (selectable or configurable) configuration of a development of interest (e.g., scenario 408). In the example shown, the scenario 408 that is chosen may be different from the scenario 308 of FIG. 3, thereby causing a change in the analyses associated with the areas 402. In some examples, the land parcels 402 and corresponding capacity score indicators 412 are presented on the map 410. In some embodiments, the visual indication of each land parcel is overlaid on the map 410 (e.g., map-based illustration, map-based display, map-based visualization). In certain embodiments, the visual indication of each land parcel includes a visual parameter 414 (e.g., color, filled pattern, line weights, etc.) indicating the corresponding capacity score, also referred to as capacity score indicator. In one example, a lighter color or shading in the visual parameter 414 may represent a lower predicted NCF score than a darker color or shading.

FIG. 4 is merely an example. One of ordinary skill in the art would recognize many variations, alternatives, and modifications.

FIG. 5 is an example interactive GUI 500 of the system that includes a map-based display of one or more smaller geospatial areas 502 (e.g., for a selected state, land parcels, etc.) that are selectable by a user, and which can display geospatial information and/or analyses (e.g., scores) based on geospatial information 504 (e.g., from one or more ML models), optionally aggregated, associated with the areas, and based on a third (selectable or configurable) configuration of a development of interest (e.g., scenario 508). In some examples, the indicated smaller geospatial areas can comprise a filtered smaller set of geospatial areas. In certain examples, a user may set the filter using the user interface components 506. In some examples, a user may set a minimum capacitor score and/or a maximum capacity score. In the example shown, the scenario 508 that is chosen may be different from the scenario 308 of FIG. 3 and the scenario of FIG. 4, thereby causing a change in the analyses associated with the areas 502 and causing a reduction in the set of geospatial areas, resulting in fewer geographical areas 502 to perform further analysis. In certain examples, the land parcels 502 are a set of filtered land parcels, for example, based on the filter of 506. FIG. 5 is merely an example. One of ordinary skill in the art would recognize many variations, alternatives, and modifications.

FIG. 6 is an example interactive GUI 600 of the system that includes a selectable listing 603 of a filtered smaller set of geospatial areas 601. The user can select a filtered subset 605 for analysis by the LLM (e.g., by clicking "Drill Down"). FIG. 6 is merely an example. One of ordinary skill in the art would recognize many variations, alternatives, and modifications.

FIG. 7 is an example interactive GUI 700 of the system that includes the results 706 of the analysis by one or more language model (e.g., LLMs) of the filtered subset 704 of geospatial areas 702. In the example shown, the results 706 may include the NCF scores. Additional results may include scores such as a potential score 710 and a feasibility score 714 as further explained herein, as well as potential descriptions 708 and feasibility descriptions 712, as explained further herein, associated with the potential score 710 and the feasibility score 714, respectively. The descriptions 708 and 712 may include selectable hyperlinks for redirecting the user to additional information, such as to a website via the Internet. FIG. 7 is merely an example. One of ordinary skill in the art would recognize many variations, alternatives, and modifications.

Figure 8:
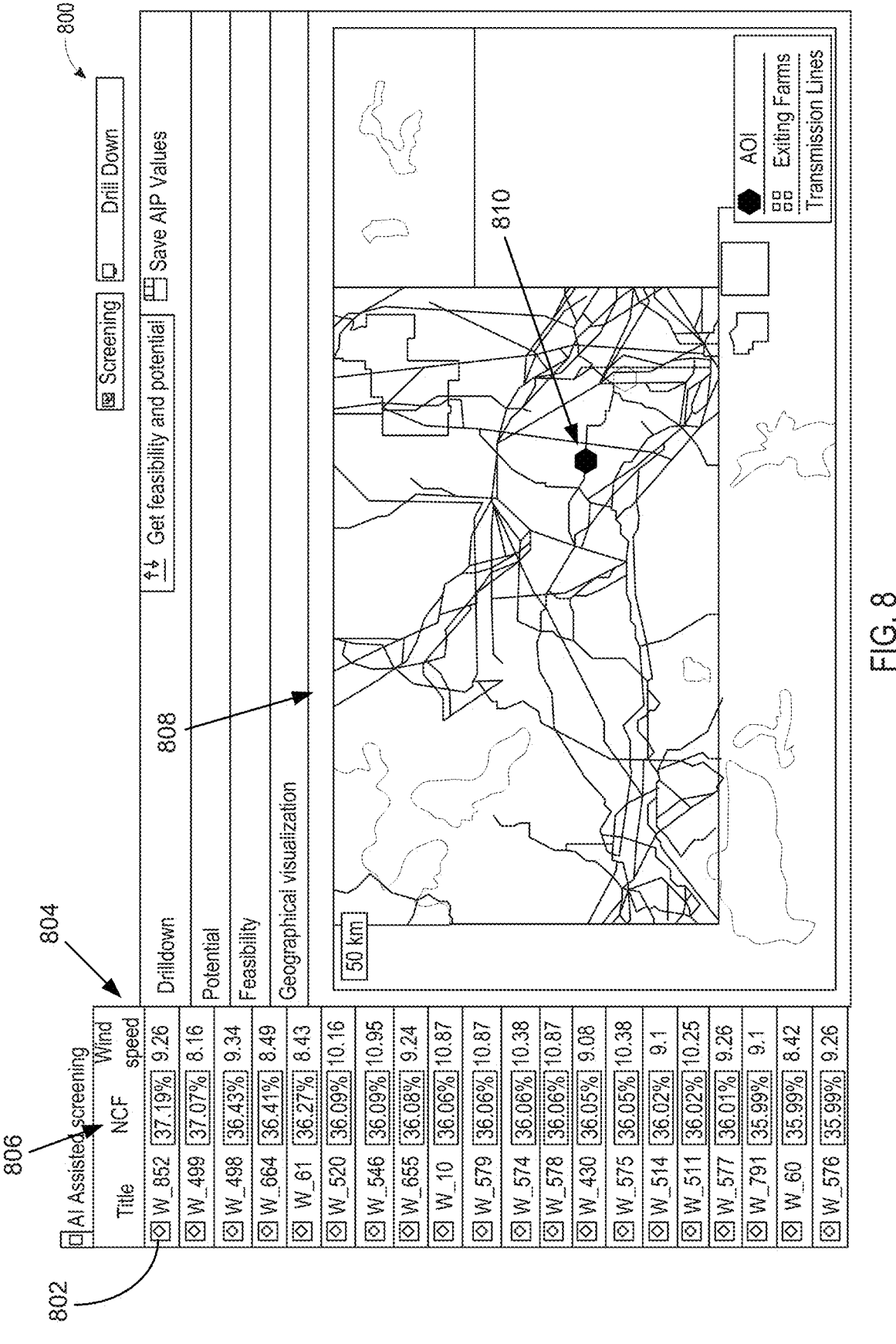
FIG. 8 is an illustration showing another example interactive GUI of the system according to certain embodiments of the present disclosure.

FIG. 8 is an example interactive GUI 800 of the system that includes the results 806 of the analysis by one or more machine learning models (e.g., language models, LLMs, etc.) of the filtered subset 804 of geospatial areas 802, in which the user has selected a particular area 810 (e.g., area of interest, "AOI") to view results specific to that area. For example, the results 806 may include the NCF score, and in some examples, the results 806 may also include additional information associated with the selected area or an area surrounding the selected area, including but not limited to existing farms and transmission lines in the area, as displayed on a map 808 as shown. FIG. 8 is merely an example. One of ordinary skill in the art would recognize many variations, alternatives, and modifications.

Figure 9:
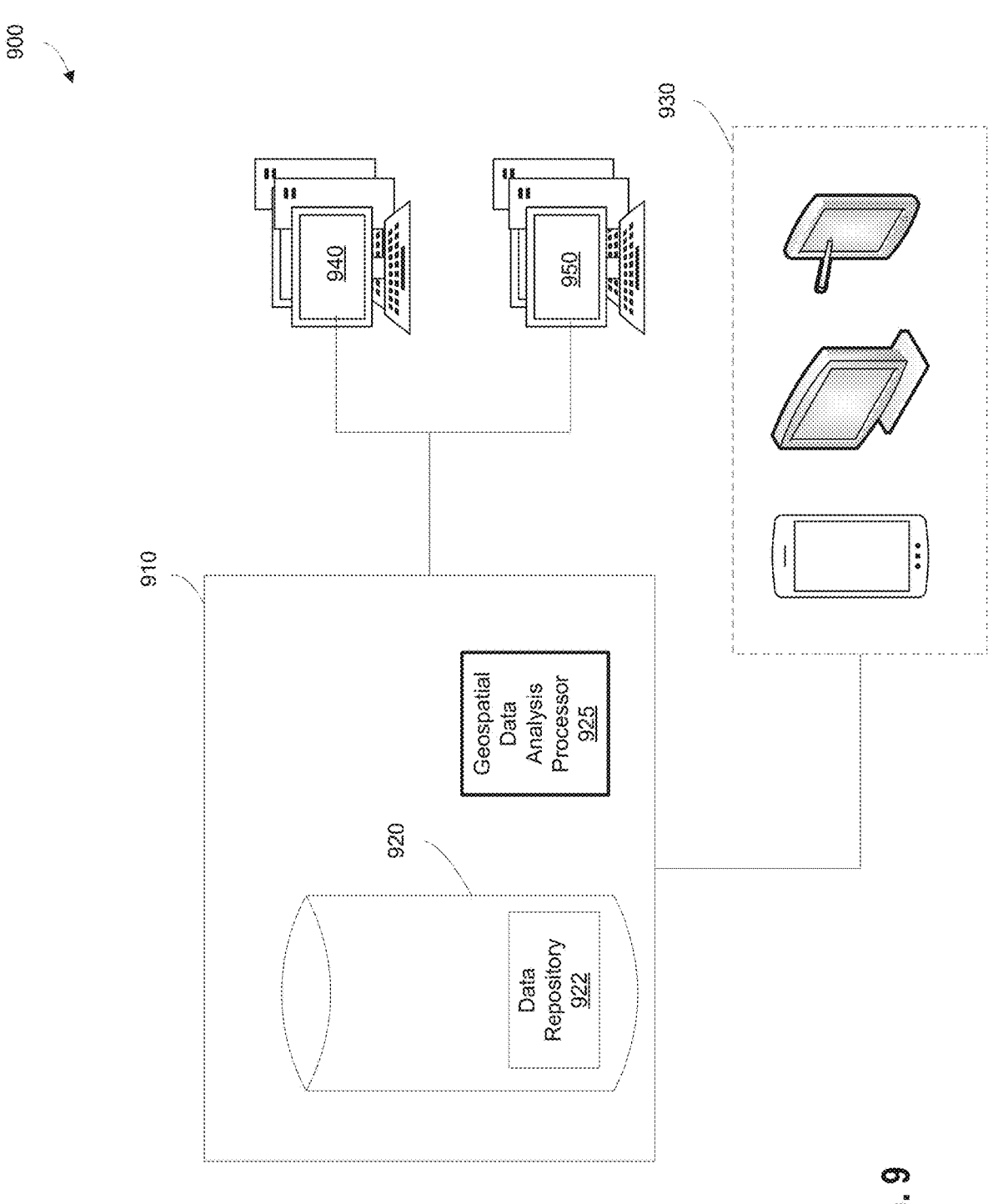
FIG. 9 is an illustrative diagram for geospatial data analysis and visualization (e.g., site prospecting) environment or workflow, according to certain embodiments of the present disclosure.

FIG. 9 is an illustrative diagram for geospatial data analysis and visualization (e.g., site prospecting) environment or workflow 900, according to certain embodiments of the present application. FIG. 9 is merely an example. One of ordinary skill in the art would recognize many variations, alternatives, and modifications. For example, some of the components may be expanded, integrated, and/or combined. Other components may be inserted into those noted above. Depending upon the embodiment, the arrangement of components may be interchanged with others replaced. Further details of these components are found throughout the present disclosure.

According to certain embodiments, the geospatial data analysis and visualization environment or workflow 900 includes a geospatial data analysis and visualization system 910, one or more client devices 930, one or more geographic data sources 940, and/or one or more feasibility data sources 950. In some embodiments, the geospatial data analysis and visualization system 910 includes one or more repositories 920, one or more data repositories 922, and one or more geospatial data analysis processors 925, and optionally, a rendering engine and/or a display.

According to some embodiments, the system 910 and/or the geospatial data analysis processor 925 receives a site request including a required site use. In certain embodiments, the site request is to select a site for the required site use. In some embodiments, the site request is to select a site for a renewable energy plant. In some embodiments, the site request is to select a site with one or more geospatial requirements. In certain embodiments, the one or more geospatial requirements include one or more environmental requirements for the selected site. In some embodiments, at least one of the one or more geospatial requirements are associated with one or more environmental features. In certain embodiments, the required site use is associated with one or more environmental requirements. In some embodiments, the required site use is associated with one or more regulatory requirements and/or governance requirements.

According to certain embodiments, the site request includes one or more site parameters. In some embodiments, the site parameters include a location parameter such as, for example, a geographic area (e.g., a country, a region, a state, an area defined by longitude and/or latitude ranges, etc.). In certain embodiments, the site parameters include a size parameter such as, for example, a required size, a desired size, a size range, and/or the like. In some embodiments, the site parameters include an environment parameter such as, for example, an environment parameter over time, wind speed greater than a threshold for a time threshold (e.g., 100 days) over a time period (e.g., a year), sunlight greater than a threshold for a time threshold (e.g., 100 days) over a time period (e.g., a year). In certain embodiments, the site parameters include a use parameter such as, for example, for a wind power plant, for a solar power plant, and/or the like. In some embodiments, the site parameters include at least one selected from a group consisting of a size, a geographic parameter, a use parameter, a wind parameter, a solar parameter, and a site use.

According to some embodiments, the system 910 and/or the geospatial data analysis processor 925 determines capacity scores for corresponding geographic areas, for example, using a capacity metric model and/or other ML models. In certain examples, the system 910 and/or the geospatial data analysis processor 925 presents the capacity scores 204 with the areas 202, as illustrated in FIG. 2, for example, via a display and/or a client device 930. In some embodiments, the geographic area (e.g., North America) is determined based on the site request and/or a site parameter in the site request. In some embodiments, the system 910 and/or the geospatial data analysis processor 925 uses a regression model to determine NCF scores for the areas. In certain embodiments, the system 910 and/or the geospatial data analysis processor 925 selects and/or receives a selection of a geographic area, for example, based on one or more user inputs and/or the determined capacity scores. In some examples, the system 910 and/or the geospatial data analysis processor 925 can select a geographic area that has the highest capacity score.

According to certain embodiments, the system 910 and/or the geospatial data analysis processor 925 breaks the selected geographic area (e.g., a large geographic area, a country, a state, a region, a province, etc.) into a plurality of land parcels. FIG. 3 illustrates an example interactive user interface 300 showing a plurality of land parcels 302. In some embodiments, each of the plurality of land parcels has substantially the same size. In certain examples, a land parcel has a shape polygon. In some examples, a size of a land parcel is determined based on the size request and/or a site parameter in the site request. In certain examples, at least two parcels have different sizes. In some embodiments, the visual indication of each land parcel is overlaid on a map (e.g., map-based illustration).

According to some embodiments, the system 910 and/or the geospatial data analysis processor 925 generates a plurality of capacity scores corresponding to the plurality of land parcels using a first machine learning model. In certain embodiments, the first machine learning model includes a regression model. In some embodiments, the first machine learning model includes one or more quantitative ML models. In certain embodiments, the first machine learning model is configured to use one or more of weather data (e.g., wind speed, temperature, vapor pressure, wind direction etc.), geographical data (e.g., latitude, longitude, terrain complexity, elevation above sea level, etc.), electric data (e.g., number of wind turbines in the vicinity, number of substations in the vicinity, etc.), infrastructure data (e.g., electric grid data, etc.), and/or the like, collectively referred to as geospatial data or geographic data. In some embodiments, the first machine learning model is configured to apply to the weather data, the geographical data, and/or the electric data. In certain embodiments, the first machine learning model is configured to output a capacity score (e.g., net capacity factor score (NCF score), percentage of rated capacity produced in a year, etc.). In some embodiments, the system 910 and/or the geospatial data analysis processor 925 presents the land parcels with indicators (e.g., color, pattern, weight, etc.) of the capacity scores, for example, on a display and/or a client device 930. FIG. 4 shows an illustrative example of a graphical user interface 400 showing land parcels 402 and corresponding capacity score indicators 412. In some embodiments, the visual indication of each land parcel is overlaid on a map (e.g., map-based illustration). In certain embodiments, the visual indication of each land parcel includes a visual parameter (e.g., color, filled pattern, line weights, etc.) indicating the corresponding capacity score, also referred to as capacity score indicator.

In certain embodiments, the system 910 and/or the geospatial data analysis processor 925 can include a machine learning model to predict and/or determine power connectivity (e.g., transmission connectivity). In some embodiments, the machine learning model can be run in parallel or subsequent to the machine learning model to generate outputs to be used for filtering the plurality of land parcels.

According to certain embodiments, the system 910 and/or the geospatial data analysis processor 925 filters the plurality of land parcels into a subset of land parcels based on the plurality of capacity scores. In some embodiments, the system 910 and/or the geospatial data analysis processor 925 removes one or more infeasible land parcels in the geographic area and/or the plurality of land parcels to generate one or more feasible areas. In some embodiments, the system 910 and/or the geospatial data analysis processor 925 filters the plurality of land parcels using a filtering threshold and/or a filtering range. In certain embodiments, each land parcel in the subset of land parcels has a capacity score greater than the filtering threshold (e.g., 0.35). In some embodiments, each land parcel in the subset of land parcels has a capacity score within the filter range (e.g., 0.35-0.5). In certain embodiments, the system 910 and/or the geospatial data analysis processor 925 filters the plurality of land parcels into a subset of land parcels based on the plurality of capacity scores and user inputs. FIG. 5 is an example user interface 500 illustrating the filtering process.

According to some embodiments, the system 910 and/or the geospatial data analysis processor 925 collects, retrieves, and/or receives geographic information associated with the subset of land parcels. In certain embodiments, the system 910 and/or the geospatial data analysis processor 925 retrieves and/or receives geographic information associated with the subset of land parcels via a software plugin (e.g., an LLM plugin). In some embodiments, a software plugin refers to a software component that adds a specific feature, for example, retrieving data from a data source. In certain embodiments, the system 910 and/or the geospatial data analysis processor 925 receives one or more data sources 940 (e.g., trusted data sources, links to data sources, indications of data sources, etc.) and retrieves geographic information from at least one of the one or more data sources. In some embodiments, by receiving the data sources 940, the system 910 and/or the geospatial data analysis processor 925 can generate land parcel descriptions more effectively. In some embodiments, by receiving the trusted data sources 940, the system 910 and/or the geospatial data analysis processor 925 can generate land parcel descriptions more accurately. In certain embodiments, the geographic information includes geographical data, weather data, transmission connectivity data, and/or other data. In some embodiments, the geographic information includes unstructured text data (e.g., natural language text data). In certain embodiments, the geographic information includes unstructured text data associated with a location (e.g., a city, an area, etc.). In some embodiments, the system 910 and/or the geospatial data analysis processor 925 allows a selection from the subset of land parcels. FIG. 6 illustrates an interactive graphical user interface 600 for selecting land parcels 601.

According to certain embodiments, for at least one land parcel in the subset of land parcels and/or for each land parcel in the subset of land parcels, the system 910 and/or the geospatial data analysis processor 925 generates a parcel potential description (e.g., parcel potential text, text output describing the potential for the land parcel) using a first language model, for example, based on the geographic information, the corresponding capacity score, and/or geographic data. In some embodiments, the first language model includes a large language model. In certain embodiments, the first language model takes the input data of one or more of a corresponding capacity score, geographic data (e.g., latitude, longitude, GPS data, altitude, etc.), unstructured text data (e.g., descriptions associated with the land parcel, weather data, etc.), and/or the like. In some embodiments, at least some of the input data is received via a software plugin. In certain embodiments, the first language model is configured to generate (e.g., output) a parcel potential description (e.g., parcel potential text, text output describing the potential for the land parcel).

According to some embodiments, for at least one land parcel in the subset of land parcels and/or for each land parcel in the subset of land parcels, the system 910 and/or the geospatial data analysis processor 925 generates a parcel potential score using a second machine learning model, for example, based on the parcel potential description. In certain embodiments, the second machine learning model includes a natural language processing model. In some embodiments, the second machine learning model generates a potential score (e.g., a score of 1-10, etc.) based at least in part on the parcel potential description. In certain embodiments, the second machine learning model generates the potential score with a range (e.g., in the range of a minimum score and a maximum score). In some embodiments, the system 910 and/or the geospatial data analysis processor 925 is configured to present the parcel potential description and/or the parcel potential score, for example, on a display and/or a client device 930. FIG. 7 shows an illustrative example of a graphical user interface 700 presenting the parcel potential description 708 and the parcel potential score 710. In certain embodiments, the first language model is coupled to the second machine learning model via a software interface (e.g., an interface between two or more software components). In some embodiments, a software interface includes an application programming interface (API), a web service interface, retrieving information from a file, retrieving information from a data repository, and/or the like.

According to certain embodiments, the system 910 and/or the geospatial data analysis processor 925 collects, retrieves, and/or receives feasibility requirements and/or feasibility information associated with the subset of land parcels. In certain embodiments, the system 910 and/or the geospatial data analysis processor 925 retrieves and/or receives feasibility information (e.g., feasibility requirements, regulatory information, governance information, etc.) associated with the subset of land parcels via a software plugin. In some embodiments, the system 910 and/or the geospatial data analysis processor 925 receives one or more data sources 950 (e.g., trusted data sources, links to data sources, indications of data sources, etc.) and retrieves feasibility information (e.g., feasibility requirements, regulatory information, governance information, ESG (environmental, social, governance) information, etc.) from at least one of the one or more data sources. In some embodiments, by receiving the data sources 950, the system 910 and/or the geospatial data analysis processor 925 can generate land parcel descriptions more effectively. In some embodiments, by receiving the trusted data sources 950, the system 910 and/or the geospatial data analysis processor 925 can generate land parcel descriptions more accurately. In certain embodiments, the feasibility information and/or requirements include ESG requirements, regulatory requirements, and/or other data. In some embodiments, the feasibility information includes unstructured text data (e.g., natural language text data). In certain embodiments, the feasibility information includes unstructured text data associated with a location (e.g., a city, an area, etc.).

According to certain embodiments, for at least one land parcel in the subset of land parcels and/or for each land parcel in the subset of land parcels, the system 910 and/or the geospatial data analysis processor 925 generates a parcel feasibility description (e.g., parcel feasibility text, text output describing the feasibility for the land parcel) using a second language model, for example, based on the feasibility information and/or geographic data. In some embodiments, the second language model includes a large language model. In certain embodiments, the second language model takes the input data of unstructured text data (e.g., descriptions associated with the land parcel, ESG data, etc.), and/or the like. In some embodiments, at least some of the input data is received via a software plugin. In certain embodiments, the second language model is configured to generate (e.g., output) a parcel feasibility description (e.g., parcel feasibility text, text output describing the feasibility for the land parcel).

According to some embodiments, at least one land parcel in the subset of land parcels and/or for each land parcel in the subset of land parcels, the system 910 and/or the geospatial data analysis processor 925 generates a parcel feasibility score using a third machine learning model, for example, based on the parcel feasibility description. In certain embodiments, the third machine learning model includes a natural language processing model. In some embodiments, the third machine learning model generates a feasibility score (e.g., a score of 1-10, etc.) based at least in part on the parcel feasibility description. In certain embodiments, the third machine learning model generates the feasibility score with a range (e.g., in the range of a minimum score and a maximum score). In some embodiments, the system 910 and/or the geospatial data analysis processor 925 is configured to present the parcel feasibility description and/or the parcel feasibility score, for example, on a display and/or a client device 930.

According to certain embodiments, the system 910 and/or the geospatial data analysis processor 925 presents, for example, via a display and/or a client device 930, the parcel potential description, the parcel potential score, the parcel feasibility description, and/or the parcel feasibility score associated with the at least one land parcel. FIG. 7 shows an illustrative example of a graphical user interface 700 (e.g., a GUI of a client device 930) presenting the parcel feasibility description 712 and the parcel feasibility score 714. In some embodiments, the processes and/or one or more processes are iterative. In certain embodiments, the first machine learning model, the second machine learning model, and/or the third machine learning model include a regression model. In some embodiments, the first language model and/or the second language model are configured to receive data from a software plugin of one or more data sources (e.g., data sources 940, data sources 950, etc.).

According to some embodiments, the system 910 and/or the geospatial data analysis processor 925 maintains a list of whitelisted software tools to interface with (e.g., via a plugin). In certain embodiments, the first machine learning model is trained and retrained using capacity scores and associated geospatial data. In some embodiments, the second machine learning model is trained and retrained using potential scores and/or associated geographic information. In certain embodiments, the third machine learning model is trained and retrained using feasibility scores and/or associated feasibility information. In some embodiments, the system 910 and/or the geospatial data analysis processor 925 can integrate with a contract system, for example, to retrieve feasibility information (e.g., leasing agreements). In certain embodiments, the system 910 and/or the geospatial data analysis processor 925 can retrieve information from a news agency to retrieve information in a timely manner. In some embodiments, the system 910 and/or the geospatial data analysis processor 925 can present the information and/or overlay information on a geographic map, for example, on a display and/or a client device 930.

In some embodiments, the geospatial analysis and visualization environment or workflow 900 includes a repository 920 which can include and/or store geospatial data, geographic information (e.g., environment data, weather data), land parcel information, capacity scores, parcel potential descriptions, parcel potential scores, parcel feasibility descriptions, parcel feasibility scores, electric data, connectivity data, feasibility information (e.g., ESG data, regulatory data, news data), and/or the like. The repository may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components in the geospatial analysis and visualization environment or workflow 900 can execute software or firmware stored in non-transitory computer-readable medium to implement various processing steps. Various components and processors of the geospatial analysis and visualization environment or workflow 900 can be implemented by one or more computing devices including, but not limited to, circuits, a computer, a cloud-based processing unit, a processor, a processing unit, a microprocessor, a mobile computing device, and/or a tablet computer. In some cases, various components of the geospatial analysis and visualization environment or workflow 900 (e.g., the system 910, the one or more processors 925, the one or more client devices 930, one or more the data sources 940/950, etc.) can be implemented on a shared computing device. Alternatively, a component of the geospatial analysis and visualization environment or workflow 900 can be implemented on multiple computing devices. In some implementations, various modules and components of the geospatial data analysis and visualization environment or workflow 900 can be implemented as software, hardware, firmware, or a combination thereof. In some cases, various components of the geospatial analysis and visualization environment or workflow 900 can be implemented in software or firmware executed by a computing device.

Various components of the geospatial data analysis and visualization (e.g., site prospecting) environment or workflow 900 can communicate via or be coupled to via a communication interface, for example, a wired or wireless interface. The communication interface includes, but is not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 10:
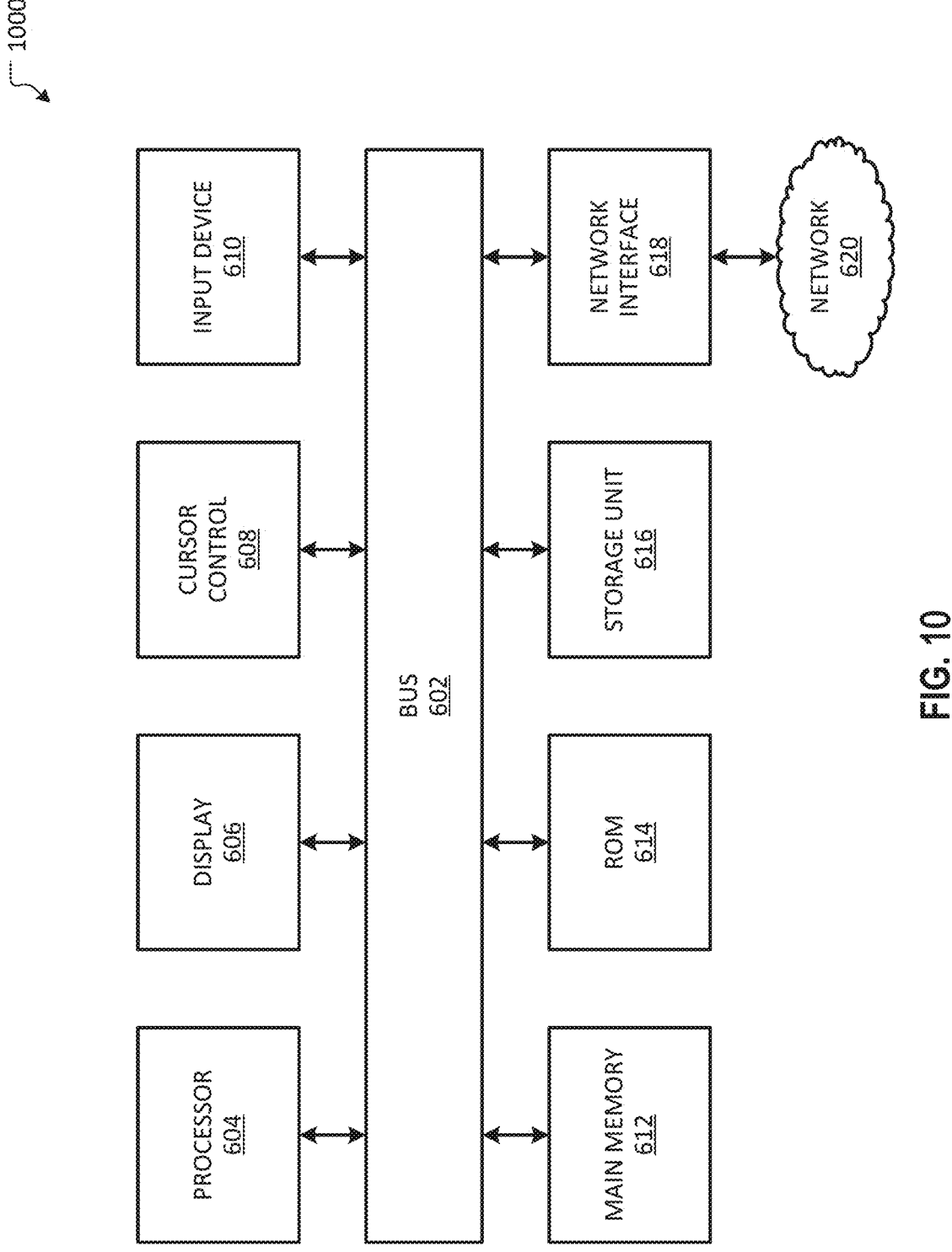
FIG. 10 is a simplified diagram showing a computing system for implementing a system for geospatial data analysis and visualization (e.g., site prospecting) according to certain embodiments of the present disclosure.

FIG. 10 is a simplified diagram showing a computing system for implementing a system 1000 for geospatial data analysis and visualization (e.g., site prospecting) in accordance with at least one example set forth in the disclosure. This diagram is merely an example, which should not unduly limit the scope of the claims. One of ordinary skill in the art would recognize many variations, alternatives, and modifications.

The computing system 1000 includes a bus 602 or other communication mechanism for communicating information, a processor 604, a display 606, a cursor control component 608, an input device 610, a main memory 612, a read only memory (ROM) 614, a storage unit 616, and a network interface 618. In some embodiments, some or all processes (e.g., steps) of the methods 1000, 300, and/or 400 are performed by the computing system 1000. In some examples, the bus 602 is coupled to the processor 604, the display 606, the cursor control component 608, the input device 610, the main memory 612, the read only memory (ROM) 614, the storage unit 616, and/or the network interface 618. In certain examples, the network interface is coupled to a network 620. For example, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For examples, the instructions, when stored in the storage unit 616 accessible to processor 604, render the computing system 1000 into a special-purpose machine that is customized to perform the operations specified in the instructions. In some examples, the ROM 614 is configured to store static information and instructions for the processor 604. In certain examples, the storage unit 616 (e.g., a magnetic disk, optical disk, or flash drive) is configured to store information and instructions.

In some embodiments, the display 606 (e.g., a cathode ray tube (CRT), an LCD display, or a touch screen) is configured to display information to a user of the computing system 1000. In some examples, the input device 610 (e.g., alphanumeric and other keys) is configured to communicate information and commands to the processor 604. For example, the cursor control component 608 (e.g., a mouse, a trackball, or cursor direction keys) is configured to communicate additional information and commands (e.g., to control cursor movements on the display 606) to the processor 604.

Examples of the implementations of the present disclosure can be described in view of the following examples, implementations, and/or clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1. A computer-implemented method comprising, by one or more hardware processors executing program instructions:

analyzing a first geographical area, and based on a development type of interest and information associated with the first geographical area, to identify a subset of the first geographical area (e.g., remove areas of the first geographical area that are not suitable or infeasible for development);

determining a plurality of geospatial areas of the subset of the first geographical area;

analyzing the plurality of geospatial areas, using a machine learning model and geospatial data (e.g., solar irradiance and/or meteorological data), to predict scores for the plurality of geospatial areas (e.g., that are indicative of, for example, the suitability and/or desirability of the geospatial areas for the development type of interest);

generating a map-based visualization of the plurality of geospatial areas and associated determined scores;

optionally analyzing the plurality of geospatial areas, using the machine learning model and geospatial data, to predict scores for the plurality of geospatial areas based on additional configurations (e.g., based on various user inputs) (e.g., of development types of interest, e.g., various configurations of renewables asset development);

determining (optionally at least in part in response to and/or based on one or more user inputs) a filtered subset of the plurality of geospatial areas based on the determined scores;

analyzing the subset of the plurality of geospatial areas using a large language model ("LLM"); and generating an output based on the analyzing using the LLM.

Clause 2. The computer-implemented method of Clause 1, wherein analyzing the subset of the plurality of geospatial areas using an LLM comprises:

submitting, to the LLM, at least information indicative of the subset of the plurality of geospatial areas, geospatial information, and/or information indicative of the development type of interest;

receiving, from the LLM, an output indicative of at least one of:

a summary of the potential, feasibility, and/or desirability of the development type of interest in each of the subset of the plurality of geospatial areas;

scores for each of the subset of the plurality of geospatial areas that are indicative of, for example, the suitability and/or desirability of the geospatial areas for the development type of interest; or an investment thesis and/or recommendation for the development type of interest.

Clause 3. A system comprising:

a computer readable storage medium having program instructions embodied therewith; and one or more processors configured to execute the program instructions to cause the system to perform the computer-implemented method of any of Clauses 1-2.

Clause 4. A computer program product comprising a computer-readable storage medium having program instructions embodied therewith, the program instructions executable by one or more processors to cause the one or more processors to perform the computer-implemented method of any of Clauses 1-2.

In various implementations, systems and/or computer systems are disclosed that comprise a computer readable storage medium having program instructions embodied therewith, and one or more processors configured to execute the program instructions to cause the systems and/or computer systems to perform operations comprising one or more aspects of the above- and/or below-described implementations (including one or more aspects of the implementations described above).

In various implementations, computer-implemented methods are disclosed in which, by one or more processors executing program instructions, one or more aspects of the above- and/or below-described implementations (including one or more aspects of the implementations described above) are implemented and/or performed.

In various implementations, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described implementations (including one or more aspects of the implementations described above).

Additional Implementation Examples and Conclusion

Implementations of the present disclosure may be implemented on or in computer systems or combinations of multiple computer systems. Although certain implementations and examples are disclosed herein, inventive subject matter extends beyond the specifically disclosed implementations and examples to other alternative implementations and/or uses and to modifications and equivalents thereof. Thus, the scope of the example implementations appended hereto is not limited by any of the particular implementations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain implementations; however, the order of description should not be construed to imply that these operations are order dependent. Additionally, the structures, systems, and/or devices described herein may be embodied as integrated components or as separate components. For purposes of comparing various implementations, certain aspects and advantages of these implementations are described. Not necessarily all such aspects or advantages are achieved by any particular implementation. Thus, for example, various implementations may be carried out in a manner that achieves or optimizes one advantage or group of advantages as taught herein without necessarily achieving other aspects or advantages as may also be taught or suggested herein.

According to certain embodiments, a method for site prospecting, the method comprising: receiving a site request indicating a required use for a site; generating a plurality of capacity scores corresponding to a plurality of land parcels using a first machine learning model; filtering the plurality of land parcels into a subset of land parcels based on the plurality of capacity scores; for at least one land parcel in the subset of land parcels, generating a parcel potential description using a first language model based at least in part on geographic information associated with the at least one land parcel; generating a parcel potential score using a second machine learning model based at least in part on the parcel potential description; presenting the parcel potential description and the parcel potential score; wherein the method is performed using one or more processors. For example, the method is implemented according to at least FIG. 1 and/or FIG. 9.

In some embodiments, the method further comprises: for at least one land parcel in the subset of land parcels, generating a parcel feasibility description using a second language model; and generating a parcel feasibility score using a third machine learning model. In certain embodiments, the method further comprises: presenting the parcel feasibility description and the parcel feasibility score. In some embodiments, the method further comprises: retrieving feasibility information associated with the site request; wherein the generating a parcel feasibility description comprises generating the parcel feasibility description by applying the second language model to a parcel location of a respective parcel and the feasibility information comprising unstructured text data. In certain embodiments, the method further comprises: receiving an indication of a feasibility data source associated with the site request; wherein the retrieving feasibility information comprises retrieving the feasibility information from the feasibility data source.

In some embodiments, the feasibility information is received via a large language model plugin. In certain embodiments, at least one of the first language model or the second language model is a large language model. In some embodiments, the method further comprises: retrieving geographic information associated with the site request, the geographic information comprising unstructured text data; wherein the generating a parcel potential description comprises generating the parcel potential description by applying the first language model to a parcel location of a respective parcel and the one or more geographic requirements and a respective capacity score for the respective parcel. In certain embodiments, the method further comprises: receiving an indication of a geographic data source associated with the site request; wherein the retrieving geographic information comprises retrieving the geographic information from the geographic data source.

In certain embodiments, the geographic information is received via a large language model plugin. In some embodiments, the one or more site parameters include at least one selected from a group consisting of a size, a geographic parameter, a use parameter, a wind parameter, a solar parameter, and a site use. In certain embodiments, each land parcel of the plurality of land parcels has a substantially similar size. In some embodiments, the substantially similar size is determined based at least in part on the site request. In certain embodiments, the first machine learning model is different from the second machine learning model. In some embodiments, the presenting the parcel potential description and the parcel potential score comprises presenting the parcel potential description and the parcel potential score with a geographic map.

According to certain embodiments, a system for site prospecting comprises one or more memories having instructions stored therein and one or more processors configured to execute the instructions and perform operations. The operations comprise: receiving a site request indicating a required use for a site; generating a plurality of capacity scores corresponding to a plurality of land parcels using a first machine learning model; filtering the plurality of land parcels into a subset of land parcels based on the plurality of capacity scores; and for at least one land parcel in the subset of land parcels, generating a parcel potential description using a first language model based at least in part on geographic information associated with the at least one land parcel; generating a parcel potential score using a second machine learning model based at least in part on the parcel potential description; presenting the parcel potential description and the parcel potential score. For example, the system is implemented according to at least FIG. 1, FIG. 9, and/or FIG. 10.

In some embodiments, the operations further comprise: for at least one land parcel in the subset of land parcels, generating a parcel feasibility description using a second language model; and generating a parcel feasibility score using a third machine learning model. In certain embodiments, the operations further comprise: presenting the parcel feasibility description and the parcel feasibility score. In some embodiments, the operations further comprise: retrieving feasibility information associated with the site request; wherein the generating a parcel feasibility description comprises generating the parcel feasibility description by applying the second language model to a parcel location of a respective parcel and the feasibility information comprising unstructured text data. In certain embodiments, the operations further comprise: receiving an indication of a feasibility data source associated with the site request; wherein the retrieving feasibility information comprises retrieving the feasibility information from the feasibility data source.

In some embodiments, the feasibility information is received via a large language model plugin. In certain embodiments, at least one of the first language model or the second language model is a large language model. In some embodiments, the operations further comprise: retrieving geographic information associated with the site request, the geographic information comprising unstructured text data; wherein the generating a parcel potential description comprises generating the parcel potential description by applying the first language model to a parcel location of a respective parcel and the one or more geographic requirements and a respective capacity score for the respective parcel. In certain embodiments, the operations further comprise: receiving an indication of a geographic data source associated with the site request; wherein the retrieving geographic information comprises retrieving the geographic information from the geographic data source.

In certain embodiments, the geographic information is received via a large language model plugin. In some embodiments, the one or more site parameters include at least one selected from a group consisting of a size, a geographic parameter, a use parameter, a wind parameter, a solar parameter, and a site use. In certain embodiments, each land parcel of the plurality of land parcels has a substantially similar size. In some embodiments, the substantially similar size is determined based at least in part on the site request. In certain embodiments, the first machine learning model is different from the second machine learning model. In some embodiments, the presenting the parcel potential description and the parcel potential score comprises presenting the parcel potential description and the parcel potential score with a geographic map.

According to certain embodiments, a method for site prospecting, the method comprising: receiving a site request indicating a required use for a site, and a plurality of geographic areas; generating a plurality of geographic area capacity scores corresponding to the plurality of geographic areas using a first machine learning model; selecting a geographic area from the plurality of geographic areas based on the plurality of geographic area capacity scores; breaking the selected geographic area into a plurality of land parcels; generating a plurality of land parcel capacity scores corresponding to the plurality of land parcels using a second machine learning model; filtering the plurality of land parcels into a subset of land parcels based on the plurality of land parcel capacity scores; for at least one land parcel in the subset of land parcels, generating a parcel potential description using a first language model based at least in part on geographic information associated with the at least one land parcel; and generating a parcel potential score using a third machine learning model based at least in part on the parcel potential description; wherein the method is performed using one or more processors. For example, the method is implemented according to at least FIG. 1 and/or FIG. 9.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system (e.g., one or more components of the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented, for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments. Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method for site prospecting using machine learning models, the method comprising:

receiving a site request indicating a required use for a site;

generating a plurality of capacity scores corresponding to a plurality of land parcels by using a first machine learning model;

filtering the plurality of land parcels by using the plurality of capacity scores to reduce the plurality of land parcels into a subset of land parcels; and for at least one land parcel in the subset of land parcels, generating a parcel potential description by using a first language model based at least in part on geographic information associated with the at least one land parcel;

generating a parcel potential score by applying a second machine learning model on the parcel potential description;

generating a parcel feasibility description by using a second language model; and generating a parcel feasibility score by applying a third machine learning model on the parcel feasibility description;

wherein the method is performed using one or more processors.

2. The method of claim 1, further comprising:

presenting the parcel feasibility description and the parcel feasibility score.

3. The method of claim 1, further comprising:

retrieving feasibility information associated with the site request;

wherein the generating a parcel feasibility description comprises generating the parcel feasibility description by applying the second language model to a parcel location of a respective parcel and the feasibility information comprising unstructured text data.

4. The method of claim 3, further comprising:

receiving an indication of a feasibility data source associated with the site request;

wherein the retrieving feasibility information comprises retrieving the feasibility information from the feasibility data source.

5. The method of claim 3, wherein the feasibility information is received via a large language model plugin.

6. The method of claim 1, wherein at least one of the first language model or the second language model is a large language model.

7. The method of claim 1, further comprising:

retrieving geographic information associated with the site request, the geographic information comprising unstructured text data;

wherein the generating a parcel potential description comprises generating the parcel potential description by applying the first language model to a parcel location of a respective parcel and the one or more geographic requirements and a respective capacity score for the respective parcel.

8. The method of claim 7, further comprising:

receiving an indication of a geographic data source associated with the site request;

wherein the retrieving geographic information comprises retrieving the geographic information from the geographic data source.

9. The method of claim 7, wherein the geographic information is received via a large language model plugin.

10. The method of claim 1, wherein one or more site parameters include at least one selected from a group consisting of a size, a geographic parameter, a use parameter, a wind parameter, a solar parameter, and a site use.

11. The method of claim 1, wherein each land parcel of the plurality of land parcels has a substantially similar size.

12. The method of claim 11, wherein the substantially similar size is determined based at least in part on the site request.

13. The method of claim 1, wherein the first machine learning model is different from the second machine learning model.

14. The method of claim 1, wherein the presenting the parcel potential description and the parcel potential score comprises presenting the parcel potential description and the parcel potential score with a geographic map.

15. A system for site prospecting using machine learning models, the system comprising:

one or more memories having instructions stored therein; and one or more processors configured to execute the instructions and perform operations comprising:

receiving a site request indicating a required use for a site;

generating a plurality of capacity scores corresponding to a plurality of land parcels by using a first machine learning model;

filtering the plurality of land parcels by using the plurality of capacity scores to reduce the plurality of land parcels into a subset of land parcels; and for at least one land parcel in the subset of land parcels, generating a parcel potential description by using a first language model based at least in part on geographic information associated with the at least one land parcel;

generating a parcel potential score by applying a second machine learning model on the parcel potential description;

generating a parcel feasibility description by using a second language model; and generating a parcel feasibility score by applying a third machine learning model on the parcel feasibility description.

16. The system of claim 15, wherein the operations further comprise:

presenting the parcel feasibility description and the parcel feasibility score.

17. The system of claim 15, wherein the operations further comprise:

retrieving feasibility information associated with the site request;

wherein the generating a parcel feasibility description comprises generating the parcel feasibility description by applying the second language model to a parcel location of a respective parcel and the feasibility information comprising unstructured text data.

18. The system of claim 17, wherein the operations further comprise:

receiving an indication of a feasibility data source associated with the site request;

wherein the retrieving feasibility information comprises retrieving the feasibility information from the feasibility data source.

19. The system of claim 15, wherein at least one of the first language model or the second language model is a large language model.

20. A method for site prospecting using machine learning models, the method comprising:

receiving a site request indicating a required use for a site, and a plurality of geographic areas;

generating a plurality of geographic area capacity scores corresponding to the plurality of geographic areas by using a first machine learning model;

selecting a geographic area from the plurality of geographic areas based on the plurality of geographic area capacity scores;

generating a plurality of land parcel capacity scores corresponding to the plurality of land parcels by using a second machine learning model;

filtering the plurality of land parcels by using the plurality of land parcel capacity scores to reduce the plurality of land parcels into a subset of land parcels;

for at least one land parcel in the subset of land parcels, generating a parcel potential description by using a first language model based at least in part on geographic information associated with the at least one land parcel;

generating a parcel potential score by applying a third machine learning model on the parcel potential description;

generating a parcel feasibility description by using a second language model; and generating a parcel feasibility score by applying a fourth machine learning model on the parcel feasibility description;

wherein the method is performed using one or more processors.

* * * * *